(12) United States Patent
Kondo

(10) Patent No.: US 7,428,459 B2
(45) Date of Patent: Sep. 23, 2008

(54) APPARATUS FOR CONTROLLING AN ENGINE USING A CAM SIGNAL

(75) Inventor: Haruhiko Kondo, Kasugai (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/700,148

(22) Filed: Jan. 31, 2007

(65) Prior Publication Data

US 2007/0175272 A1    Aug. 2, 2007

(30) Foreign Application Priority Data

Feb. 1, 2006    (JP)    ............................. 2006-024668

(51) Int. Cl.
G06F 19/00    (2006.01)
F02P 5/00    (2006.01)
(52) U.S. Cl. .................. 701/114; 123/406.18; 123/487; 73/116
(58) Field of Classification Search ......... 701/102–115; 123/406.18, 406.22, 406.58, 406.62, 406.63, 123/486, 487, 612, 613, 617, 479, 106.18; 73/116, 118.1
See application file for complete search history.

(56) References Cited

U.S. PATENT DOCUMENTS

| 6,445,998 | B2 | 9/2002 | Ando |
| 6,473,687 | B2 | 10/2002 | Ando |
| 6,493,628 | B2 * | 12/2002 | Ando ......................... 701/105 |
| 6,498,979 | B2 * | 12/2002 | Ando ......................... 701/102 |
| 7,089,149 | B2 * | 8/2006 | Sugiura et al. ............. 702/151 |
| 7,197,391 | B2 * | 3/2007 | Kunibe et al. .............. 701/114 |
| 2006/0167615 | A1 | 7/2006 | Kunibe et al. |

FOREIGN PATENT DOCUMENTS

| JP | 2000-104619 | 4/2000 |
| JP | 2001-200747 | 7/2001 |
| JP | 2001-214790 | 8/2001 |
| JP | 2001-280193 | 10/2001 |
| JP | 2006-200484 | 8/2006 |

* cited by examiner

Primary Examiner—John T Kwon
(74) Attorney, Agent, or Firm—Nixon & Vanderhye PC

(57) ABSTRACT

In an apparatus for controlling an engine, an abnormality determining unit determines whether the crank signal is abnormal based on a state of a input signal for an interval measuring unit. The interval measuring unit measures a time interval from when a predetermined-directed level change appears in the input signal and a temporally next predetermined-directed level change appears therein. An input unit switches the input signal for the interval measuring unit from a crank signal to a cam signal when it is determined that the crank signal is abnormal. The crank signal has a level that repetitively changes in a predetermined direction each time the crankshaft rotates by a first angle. The cam signal has a level that repetitively changes in time in a predetermined direction each time the camshaft rotates at least by a second angle different from the first angle.

7 Claims, 15 Drawing Sheets

APPARATUS FOR CONTROLLING AN ENGINE USING A CAM SIGNAL

CROSS REFERENCE TO RELATED APPLICATION

This application is based on Japanese Patent Application 2006-024668 filed on Feb. 1, 2006 and claims the benefit of priority therefrom, so that the descriptions of which are all incorporated herein by reference.

BACKGROUND OF THE INVENTION

1. Field of the Invention

The present invention relates to apparatuses for controlling an engine using a cam signal.

2. Description of the Related Art

Engine control units for vehicles use a crank signal whose signal level varies in a predetermined same direction at regular rotation angles (regular crank angles) of an engine crankshaft. Specifically, the crank signal is measured by a crankshaft sensor connected to an engine control unit, and the measured crank signal is input to the engine control unit operating in a main control mode.

Specifically, the engine control unit works to identify a rotational position (crank position) of the crankshaft based on the crank signal during the main control mode.

Each time it is determined that the identified rotational position of the crankshaft is matched with a desired rotational position, the engine control unit works to generate events associated with engine control, such as fuel injection or ignition during the main control mode.

Such a structure of the engine control unit described above is for example disclosed in Japanese Unexamined Patent Publication No. 2001-200747 and U.S. Pat. No. 6,445,998B1 corresponding to Japanese Unexamined Patent Publication No. 2001-214790.

In such an engine control unit using the crank signal for engine control, if the crank signal cannot be input normally to the engine control unit due to, for example, a break in wires connecting the crankshaft sensor and the engine control unit, the engine control unit cannot identify the rotational position of the crankshaft. This may cause the engine control unit not to continuously carry out proper control of the engine.

In order to address the problem, when the crank signal cannot be input normally to the engine control unit, the engine control unit is configured to operate in a sub control mode using a cam signal measured by a cam sensor. The cam signal has a level that varies in a predetermined same direction at regular rotation angles of an engine camshaft.

This allows the engine control unit to continuously generate events associated with engine control based on the cam signal during the sub control mode.

Specifically, when an occurrence of a failure in the crank signal is detected, the engine control unit is configured to switch its operation mode from the main control mode using the crank signal to the sub control mode using the cam signal so as to continuously carry out engine control. The engine control of the engine control unit in the sub control mode allows the vehicle to be driven in a limp-home mode, such as driven to a safe place slowly.

It is to be noted that the regular rotation angle of the crankshaft corresponding to a time interval between temporally adjacent signal-levels of the crank signal varying in the predetermined same direction is different from that of the camshaft corresponding to a time interval between temporally adjacent signal-levels of the cam signal varying in the predetermined same direction.

Specifically, in order to operate in the main control mode, the engine control unit requires the regular rotation angles of the crankshaft, but in order to operate in the sub control mode, it requires the regular rotation angles of the camshaft.

Accordingly, in the engine control unit, a main control system operating based on the regular rotation angles of the crankshaft and a sub control system operating based on the regular rotation angles of the camshaft may be independently constructed by hardware components and/or software components.

This may however increase hardware/software components in the engine control unit.

SUMMARY OF THE INVENTION

In view of the background, an object of at least one aspect of the present invention is to allow, even if an error arises in a crank signal, a vehicle to be driven in a limp-home mode without increasing hardware components and/or software components in an apparatus for controlling an engine of the vehicle.

According to an aspect of the present invention, there is provided an apparatus for controlling an engine having a crankshaft and a camshaft. The apparatus includes an interval measuring unit configured to receive an input signal input thereto. The input signal has a level that repetitively changes in time in a predetermined direction. The interval measuring unit is configured to measure a time interval from when a predetermined-directed level change appears in the input signal and a temporally next predetermined-directed level change appears therein. The apparatus includes an input unit configured to input a crank signal as the input signal to the interval measuring unit. The crank signal has a level that repetitively changes in a predetermined direction each time the crankshaft rotates by a first angle. The apparatus includes a multiplication clock generating unit configured to generate a first multiplication clock including a train of clock pulses whose clock cycle is determined by dividing, by a first multiplication number, the interval measured by the interval measuring unit. The apparatus includes a count unit configured to count in synchronization with the first multiplication clock generated by the multiplication clock generating unit. A count value of the count unit corresponds to a rotational position of the crankshaft in one cycle of the engine when the rotational position thereof is represented with a predetermined resolution. The predetermined resolution is obtained by dividing the first angle by the first multiplication number. The apparatus includes an event generating unit configured to generate at least one event associated with control of the engine according to a crankshaft's rotational position identified by a count value of the count unit. The apparatus includes an abnormality determining unit configured to determine whether the crank signal is abnormal based on a state of the input signal. The input unit works to switch the input signal for the interval measuring unit from the crank signal to a cam signal when it is determined that the crank signal is abnormal. The cam signal has a level that repetitively changes in time each time the camshaft rotates at least by a second angle different from the first angle. The multiplication clock generating unit works to generate a second multiplication clock to be used in place of the first multiplication clock after it is determined that the crank signal is abnormal. The second multiplication clock includes a train of clock pulses whose clock cycle being set to be substantially equivalent to the clock cycle of the first multiplication clock.

With the structure of the one aspect of the present invention, when the crank signal is abnormal, because the cam signal whose level repetitively changes in time in the predetermined direction each time the camshaft rotates at least by the second angle different from the first angle is input to the interval measuring unit in place of the crank signal.

This allows the clock cycle of the first multiplication clock to be matched with that of the second multiplication clock before and after change of the input signal from the crank signal to the cam signal. In other words, the clock cycle of the multiplication clock to be generated by the multiplication clock generating unit is substantially constant before and after change of the input signal from the crank signal to the cam signal.

This makes it unnecessary for the count unit and event generating unit to execute specific tasks for switching their operations before and after change of the input signal.

As set forth above, the apparatus according to the one aspect of the present invention is designed to, when the crank signal is abnormal, just change the input signal from the crank signal to the cam signal whose level repetitively changes in time in the predetermined direction each time the camshaft rotates at least by the second angle different from the first angle. This allows the clock cycle of the first multiplication clock to be matched with that of the second multiplication clock before and after change of the input signal from the crank signal to the cam signal. It is therefore possible to continue engine control based on the cam signal even when a failure occurs in the crank signal, making it unnecessary for the multiplication clock generating unit, the count unit, and the event generating unit to execute specific tasks for switching their operations before and after change of the input signal.

As a result, even if an error arises in the crank signal, a vehicle in which the engine and the apparatus are installed beforehand can be driven in a limp-home mode based on control of the engine by the apparatus using the cam signal without increasing hardware components and/or software components in the apparatus.

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT OF THE INVENTION

An embodiment of the present invention will be described hereinafter with reference to the accompanying drawings. In the embodiment, the invention is applied to an electronic control unit (ECU) 1, and the ECU 1 serves as an engine control unit operative to control a four-cycle internal combustion engine E installed in a vehicle and having, for example, the first (#1) to sixth (#6) cylinders.

Figure 1:
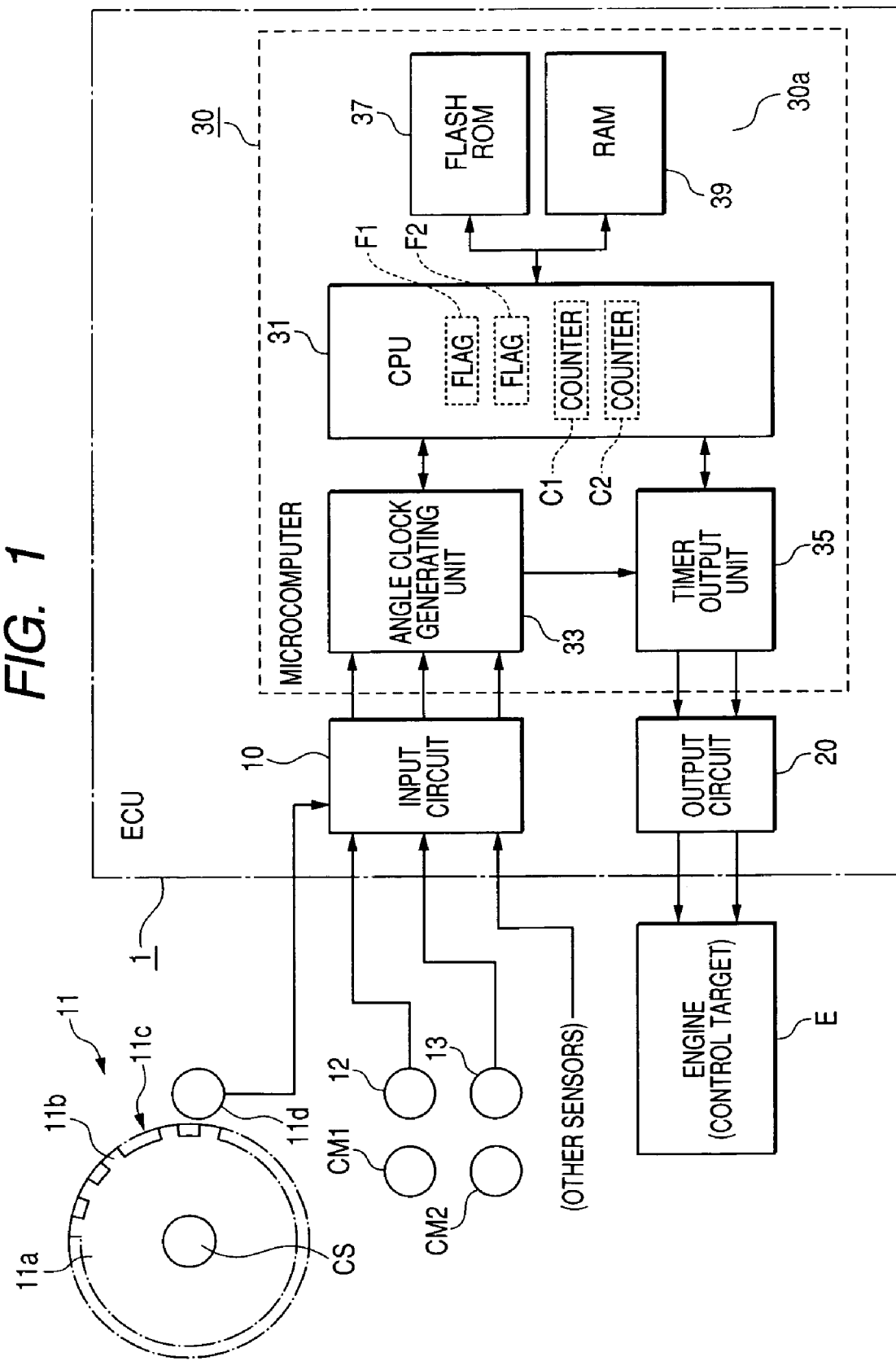
FIG. 1 is a block diagram schematically illustrating an example of the structure of an electronic control unit installed in a vehicle according to an embodiment of the present invention.

FIG. 1 is a block diagram illustrating an example of the structure of the ECU 1, which is installed in advance in the vehicle according to the embodiment of the present invention.

Referring to FIG. 1, the ECU 1 according to the embodiment is provided with an input circuit 10, an output circuit 20, and a microcomputer 30. The input and output circuits 10 and 20 are electrically connected to the microcomputer 30.

The input circuit 10 is electrically connected to a crankshaft sensor 11, a first camshaft sensor 12, a second camshaft sensor 13, and other sensors.

As illustrated in FIG. 1, the crankshaft sensor 11 for example includes a reluctor disc 11a having a plurality of teeth 11b substantially spaced at angle intervals of, for example, 6 degrees around the periphery of the disc 11a. The reluctor disc 11a is coaxially mounted on a crankshaft CS serving as the engine's main shaft for delivering rotary motion taken from the reciprocating pistons and rods of the cylinders.

The reluctor disc 11a has, for example, a tooth-missing portion 11c composed of, for example, k adjacent teeth missing.

The crankshaft sensor 11 for example includes a pickup 11d operative to, for example, magnetically detect the teeth 11b of the reluctor disc 11a on the crankshaft CS as it rotates to generate a crank signal based on the detected result. The crank signal is input to the input circuit 10.

In the embodiment, when the rotational position of the crankshaft CS reaches within a given rotational region so that the tooth-missing portion 11c is located in front of the pickup 11d to be detectable thereby, the rotational region of the crankshaft CS will be referred to as "specified region" hereinafter.

Because the tooth-missing portion 11c appears once every rotation angle (crank angle) of the crankshaft CS of 360 degrees (360° CA), the crankshaft CS reaches the specified region every crank angle of 360 degrees. In other words, the crankshaft CS reaches the specified region twice per one engine cycle (the crank angle of 720 degrees).

The first camshaft sensor 12 is operative to, for example, magnetically detect rotational positions of a first camshaft CM1 as it rotates, for example, at one-half rotational speed of the crankshaft CS to generate a first cam signal based on the detected result. The first cam signal is input to the input circuit 10.

Similarly, the second camshaft sensor 13 is operative to, for example, magnetically detect rotational positions of a second camshaft CM2 as it rotates, for example, at one-half rotational speed of the crankshaft CS to generate a second cam signal based on the detected result. The second cam signal is input to the input circuit 10.

Specifically, the first and second camshafts CM1 and CM2 are configured to be driven by gears, belts, and/or a chain from the crankshaft CS, and contain a series of cams for opening and closing the intake and exhaust valves, respectively.

The crank signal is configured to have a level repetitively varying in time like pulses with rotation of the crankshaft CS. Similarly, the first cam signal is configured to have a level repetitively varying in time like pulses with rotation of the first camshaft CM1, and the second cam signal is configured to have a level repetitively varying in time like pulses with rotation of the second camshaft CM2.

Next, the configurations of the crank signal and the first and second cam signals will be described in detail hereinafter with reference to FIG. 2.

Figure 2:
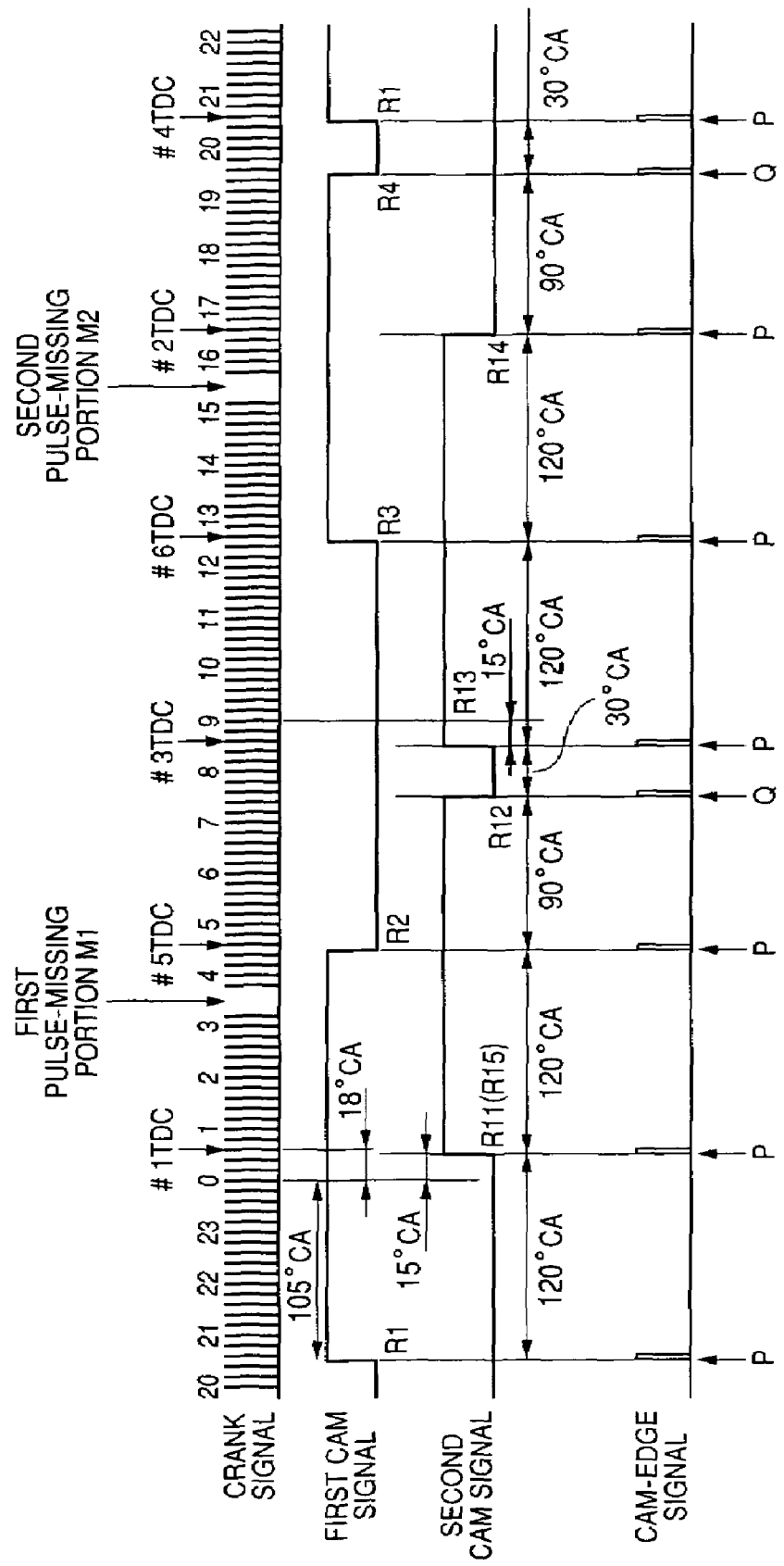
FIG. 2 is a signal waveform chart schematically illustrating a crank signal, first and second cam signals, and a cam-edge signal according to the embodiment of the present invention.

As illustrated in FIG. 2, the level of the crank signal changes in a predetermined same direction in a pulse every time the crank shaft CS (the reluctor disc 11a) rotates at a unit angle $\Delta\theta$ degrees crank angle (CA) while the rotational position of the crankshaft CS is not located within the specified region. In the embodiment, for example, the predetermined same direction is set to a high-to-low direction, and the unit angle $\Delta\theta$ degrees crank angle is set to 6 degrees crank angle.

On the other hand, while the rotational position of the crankshaft CS is located within the specified region, a rotational angle of the crankshaft CS that allows the level of the crank signal to change in the same direction (high-to-low direction) in a pulse is k-times greater than the unit angle $\Delta\theta$. In the embodiment, k is set to 3.

In other words, while the rotational position of the crankshaft CS is located within a region except for the specified region, a same-directed active edge, such as a trailing edge, of the transient level change of the crank signal in a pulse appears every time the crankshaft CS rotates at the unit angle $\Delta\theta$.

On the other hand, while the rotational position of the crankshaft CS is located within the specified region, same-directed k−1 active edges of the transient level change of the crank signal do not appear even though the crankshaft CS continuously rotates every unit angle $\Delta\theta$.

Note that same-directed active edges, such as trailing edges or rising edges, appearing in a signal whose level transiently repetitively changes in time like a pulse signal will be referred to merely as "active edges" hereinafter.

This allows a time interval between temporally adjacent active edges of the crank signal while the rotational position of the crankshaft CS is located within the specified region to be k-times greater than a normal time interval. The normal time interval is an interval between temporally adjacent active edges of the crank signal while the rotational position of the crankshaft CS is located within a region except for the specified region.

It is to be noted that a portion of the crank signal corresponding to the specified region, in other words, the k-times time interval between temporally adjacent active edges of the crank signal as compared with the normal time interval will be referred to as a pulse-missing portion M hereinafter.

Because the tooth-missing portion 11c appears once every the rotation angle (crank angle) of the crankshaft CS of 360 degrees (360° CA), the pulse-missing portion M also appears, in the crank signal, once every crank angle of 360 degrees.

In the crank signal according to the embodiment, an active edge appearing every time the crankshaft CS rotates at a predetermined crank angle of, for example, 120 degrees CA corresponds to TDC (Top Dead Center) of each of the individual cylinders #1, #5, #3, #6, #2, and #4 in this order in FIG. 2. The predetermined crank angle of 120 degrees can be set by dividing the crank angle of 720 degrees corresponding to one engine cycle by the number of cylinders, such as 6.

A reference position of the crank signal is set to correspond to an active edge a predetermined crank angle of, for example 18 degrees before the active edge corresponding to the TDC of the first cylinder #1. The reference position of the crank signal is illustrated by "0" in FIG. 2.

As described above, the pulse-missing portion M appears, in the crank signal, once every crank angle of 360 degrees. In other words, the pulse-missing portions M are divided into first pulse-missing portions M1 and second pulse-missing portions M2.

In the crank signal, the first pulse-missing portion M1 starts from a first active edge the crank angle of 108 degrees after the active edge appearing at the reference position every engine cycle. The second pulse-missing portion M2 starts from a second active edge the crank angle of 360 degrees after the first active edge every engine cycle.

Specifically, the k-times time interval as compared with the normal time interval after the first active edge corresponds to the first pulse-missing portion M1, and the k-times time interval as compared with the normal time interval after the second active edge corresponds to the second pulse-missing portion M2.

Next, the first cam signal is configured to:

vary from a low level to a high level when the first camshaft CM1 is located at a first rotational position R1 the crank angle of 105 degrees before the reference position;

hold the high level during a first period corresponding to the crank angle of 240 degrees from the high-level turning timing;

vary from the high level to the low level at a second rotational position R2 immediately after the elapse of the first period;

hold the low level during a second period corresponding to the crank angle of 240 degrees from the low-level turning timing;

vary from the low level to the high level at a third rotational position R3 immediately after the elapse of the second period;

hold the high level during a third period corresponding to the crank angle of 210 degrees from the high-level turning timing;

vary from the high level to the low level at a fourth rotational position R4 immediately after the elapse of the third period;

hold the low level during a fourth period corresponding to the crank angle of 30 degrees from the low-level turning timing so as to return the first rotational position R1, thereby repeating the series of variations every engine cycle (crank angle of 720 degrees).

The second cam signal is configured to:

vary from a low level to a high level when the second camshaft CM2 is located at a first rotational position R11 the crank angle of 15 degrees after the reference position;

hold the high level during a first period corresponding to the crank angle of 210 degrees from the high-level turning timing;

vary from the high level to the low level at a second rotational position R12 immediately after the elapse of the first period;

hold the low level during a second period corresponding to the crank angle of 30 degrees from the low-level turning timing;

vary from the low level to the high level at a third rotational position R13 immediately after the elapse of the second period;

hold the high level during a third period corresponding to the crank angle of 240 degrees from the high-level turning timing;

vary from the high level to the low level at a fourth rotational position R14 immediately after the elapse of the third period;

hold the low level during a fourth period corresponding to the crank angle of 240 degrees from the low-level turning timing so as to return the first rotational position R11, thereby repeating the series of variations every engine cycle (crank angle of 720 degrees).

The other sensors are installed beforehand in the vehicle and arranged to measure various types of physical quantities. These physical quantities are required for the ECU 1 to control the individual control targets. Measurement signals indicative of measurands output from the other sensors are periodically input to the input circuit 10.

The input circuit 10 serves as a waveform shaping circuit. Specifically, the input circuit 10 is operative to apply waveform shaping to the crank signal, the first and second cam signals, and the measurement signals respectively output from the crankshaft sensor 11, the first and second cam sensors 12 and 13, and the other sensors. In addition, the input circuit 10 is operative to output the waveform-shaped signals to the microcomputer 30.

The output circuit 20 is operative to output, to control targets associated with engine control, such as injectors and/or igniters for the respective cylinders, activation signals described hereinafter, based on target-control instructions sent from the microcomputer 30.

The microcomputer 30 consists essentially of a CPU 31, an angle clock generating unit 33, a timer output unit 35, a flash ROM 37, and a RAM 39; these units 33, 35, 37, and 39 are electrically connected to the CPU 31.

The CPU 31 is operative to control the entire microcomputer 30.

The angle clock generating unit 33 is operative to receive the crank signal and the first and second cam signals output from the input circuit 10.

The timer output unit 35 for example incorporates first and second timers and is operative to output, to the output circuit 20, the target-control instructions based on count values of the first and second timers for each of the individual control targets; these target-control instructions determine a standby period and an active period for each of the individual control targets.

The flash ROM 37 is used as an example of various types of nonvolatile memories. Specifically, the flash ROM 37 has stored therein a plurality of programs. At least one of the programs causes the CPU 31 to execute various tasks including: (1) an input signal diagnosing task, (2) time-synchronized task, (3) crank-edge interrupt task, (4) cam-edge interrupt task, and (5) pass-angle interrupt task, which will be described hereinafter.

The RAM 39 is operative to be quickly accessible by the CPU 31 and to store therein data processed by the CPU 31.

Figure 3:
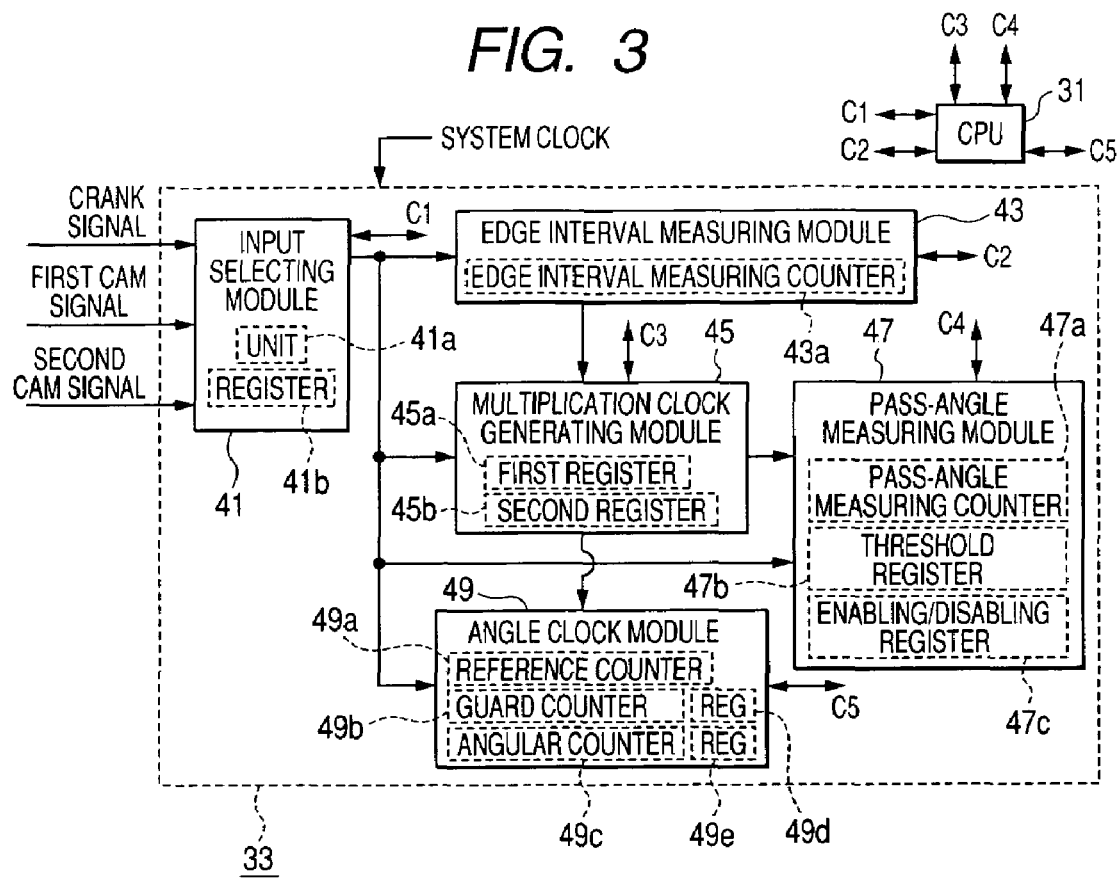
FIG. 3 is a block diagram schematically illustrating an example of the structure of an angle clock generating unit illustrated in FIG. 1.

As illustrated in FIG. 3, the angle clock generating unit 33 includes an input selecting module 41, an edge interval measuring module 43, a multiplication clock generating module 45, a pass-angle interrupt module 47, and an angle clock module 49. Each of the modules 41, 43, 45, 47, and 49 is operatively connected to the CPU 31.

The input selecting module 41 is operatively connected to the edge interval measuring module 43, the multiplication clock generating module 45, the pass-angle interrupt module 47, and the angle clock module 49.

The input selecting module 41 incorporates a unit 41a configured to receive the crank signal and the first and second cam signals sent from the input circuit 10, and to select one of the received crank signal and a signal; this signal is generated by the unit 41a based on the received first and second cam signals. The unit 41a of the input selecting module 41 is configured to output the selected one of the crank signal and the generated signal to the CPU 31.

Specifically, the signal generated by the unit 41a using the first and second cam signals is configured to have a level transiently vary in time in a predetermined same direction, such as a low-to-high direction, each time a level-variation appears in the individual first and second cam signals. In other words, in the signal generated by the unit 41a, a same-directed active edge, such as a rising edge, appears each time a level-inversion appears in the individual first and second cam signals. The signal generated by the unit 41a described above will be referred to as "cam-edge signal" hereinafter. Same-directed active edges of the cam-edge signal will be referred to merely as "active edges" hereinafter.

Specifically, as illustrated in FIG. 2, the level of the cam-edge signal is configured to transiently change in time in the low-to-high direction at individual change points P and Q corresponding to the individual level-variation timings of the first and second cam signals.

In the embodiment, the cam-edge signal regularly changes in level at the change points P whose angular interval corresponds to the crank angle of 120 degrees crank angle except for the change points Q whose angular interval corresponds to the crank angle of 360 degrees.

For example, the input selecting module 41 can be designed to logically OR the first and second cam signals to generate the cam-edge signal.

The input selecting module 41 also incorporates a register 41b that can store at least one bit of data rewritable by the CPU 31. In the embodiment, the at least one bit of data indicative of "1" is stored beforehand in the register 41*b* as a default.

The data "1" stored in the register 41*b* enables the input selecting unit 41 to selectively pass, as an input signal, any one of the crank signal and the cam-edge signal to at least one of the modules 43, 45, 47, and 49 based on instructions sent from the CPU 31.

In contrast, when the at least one bit of data is rewritten into "0" by the CPU 31, the data "0" prevents the input selecting module 41 from passing the crank signal and the cam-edge signal to the modules 43, 45, 47, and 49.

The edge interval measuring module 43 is operatively connected to the multiplication clock generating module 45, and contains an edge interval measuring counter 43*a*.

Each time an active edge currently appears in the input signal passed from the input selecting module 41 to the edge interval measuring module 43, the edge interval measuring counter 43*a* works to measure a time interval between the current active edge and the next active edge temporally adjacent thereto appearing in the input signal.

Specifically, each time an active edge currently appears in the input signal, the edge interval measuring counter 43*a* works to:

reset its count value; and, immediately after the reset, count up the number of active edges (trailing edges or rising edges) of clock pulses of a system clock generated by the microcomputer 30 until the next temporally adjacent active edge appears in the input signal.

Figure 4:
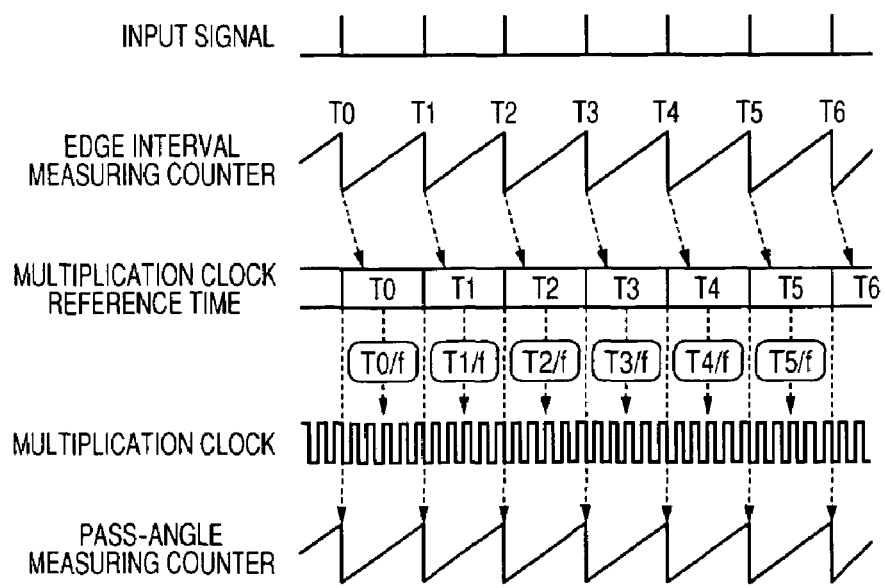
FIG. 4 is a time chart schematically illustrating variations of parameters of the angle clock generating unit with variation of an input signal according to the embodiment of the invention.

It is to be noted that the system clock allows synchronization of the tasks in the microcomputer 30 with each other. As described above, the system clock consists of a repetitive series of the clock pulses with a constant clock cycle and a constant clock frequency; this clock frequency is higher than a frequency of active edges in the input signal. The variation of the count value of the edge interval measuring counter 43*a* is schematically illustrated in FIG. 4.

As a result, individual intervals between temporally adjacent current and next active edges in the input signal passed from the input selecting module 41 to the edge interval measuring module 43 are sequentially measured as corresponding individual count values of the edge interval measuring counter 43*a* of the edge interval measuring module 43.

The edge interval measuring module 43 is also operative to pass a count value (measured interval) of the edge interval measuring counter 43*a* to the multiplication clock generating module 45 each time a next active edge currently appears in the input signal before reset of the count value.

The multiplication clock generating module 45 is operatively connected to the pass-angle measuring module 47 and the angle clock module 49, and contains first and second registers 45*a* and 45*b*. The second register 45*b* is operative to store therein a multiplication number f. In the embodiment, a default of the multiplication number f is set to 60 for the crank signal, and the multiplication number f for the crank signal whose default is "60" will be specifically expressed by "f1" hereinafter.

Each time a count value of the edge interval measuring counter 43*a* is passed to the multiplication clock generating module 45, the multiplication clock generating module 45 works to:

receive the count value (measured interval);

store the received count value in the first register 45*a* as a multiplication-clock reference time (see "multiplication-clock reference time" in FIG. 4);

divide the multiplication-clock reference time stored in the first register 45*a* by the multiplication number f stored in the second register 45*b* to generate a multiplication clock consisting of a repetitive series of multiplication clock pulses whose clock cycle is a multiplication-number submultiple of the multiplication-clock reference time (see "multiplication clock" in FIG. 4); and output the generated multiplication clock to the pass-angle measuring module 47 and the angle clock module 49.

Because the multiplication-clock reference time depends on the count value of the edge interval measuring counter 43*a* depending on a corresponding interval of temporally adjacent active edges in the input signal, the clock cycle of the multiplication clock depends on change of the multiplication-clock reference time.

For example, as illustrated in FIG. 4, when a count value T0 is stored in the first register 45*a* as the multiplication-clock reference time, the cycle of the multiplication clock is set to T0/f. When the count value T0 stored in the first register 45*a* is updated to a count value T1, the cycle of the multiplication clock signal is changed from T0/f to T1/f.

Similarly, when the count value T1 stored in the first register 45*a* is updated to a count value T2, the cycle of the multiplication clock signal is changed from T1/f to T2/f. The same applies to when count values stored in the first register 45*a* are updated to T3 to T5.

The pass-angle measuring module 47 incorporates a pass-angle measuring counter 47*a* for counting up the number of variations in the multiplication clock in a predetermined same direction, such as a low-to-high direction in the embodiment.

Specifically, the pass-angle measuring counter 47*a* works to:

receive the multiplication clock output from the multiplication clock generating module 45;

reset its count value each time an active edge of the input signal is input thereto via the pass-angle interrupt module 47; and count up the number of rising edges of the multiplication clock pulses of the received multiplication clock until the next temporally adjacent active edge of the input signal is input to the pass-angle measuring counter 47*a* (see "pass-angle measuring counter" in FIG. 4).

As described above, the input signal to be input from the input selecting module 41 to the pass-angle interrupt module 47 is any one of the crank signal and the cam-edge signal. The crank signal is configured to have a level transiently varying repetitively in time with rotation of the crankshaft CS, and the cam-edge signal is configured to have a level transiently varying repetitively in time in a predetermined same direction, such as a low-to-high direction, with rotation of any one of the first and second camshafts CM1 and CM2.

Thus, the multiplication clock has a clock cycle that is an integral submultiple of a corresponding time interval between temporally adjacent active edges in the input signal (any one of the crank signal and the cam-edge signal).

Accordingly, the pass-angle measuring counter 47*a* is operative to measure a rotational angle of the crankshaft CS between each temporally adjacent active edges in the input signal with a high resolution as compared with that as in the case of measuring the rotational angle in synchronization with an active edge of the input signal.

In other words, the pass-angle measuring counter 47*a* is operative to measure a rotational angle of the crankshaft CS passing from 0 degrees crank angle to $\Delta\theta$ degrees crank angle between each temporally adjacent active edges in the input signal with a resolution f-times greater than that as in the case of measuring the rotational angle in synchronization with an active edge of the input signal.

It is to be noted that a measured value (count value) of the pass-angle measuring counter 47a depends on a corresponding time interval between temporally adjacent active edges in the input signal.

In addition, the pass-angle measuring module 47 includes a threshold register 47b for storing a threshold value for the count value of the pass-angle measuring counter 47a. The pass-angle measuring module 47 is operative to generate an interrupt when the count value of the pass-angle measuring counter 47a is equal to or greater than the threshold value stored in the threshold register 47b, thereby outputting the interrupt to the CPU 31.

In the embodiment, a default of the threshold value is set to a predetermined value greater than a reference count value that the pass-angle measuring counter 47a can reach while no pulse-missing portions M appear in the crank signal; this reference count value corresponds to $\Delta\theta$ degrees crank angle of the crankshaft CS.

In addition, the default of the threshold value is set to be smaller than a specified count value that the pass-angle measuring counter 47a can reach while one of the pulse-missing portions M appears in the crank signal.

For example, as the default of the threshold value, a value 2.5 times as great as the reference count value $\Delta\theta$ is stored in the threshold register 47b; this default of the threshold is given by $2.5 \times \Delta\theta$.

The pass-angle measuring module 47 also includes an enabling/disabling register 47c for storing information indicative of "enabling" or "disabling" under control of the CPU 31. As a default of the information, the information indicative of "disabling" is stored beforehand in the enabling/disabling register 47c.

The angle clock module 49 includes a reference counter 49a, a guard counter 49b, and an angular counter 49c.

The reference counter 49a is operative to count up the number of variations in the multiplication clock in the predetermined same direction, such as the low-to-high direction, in the embodiment.

The guard counter 49b is operative to count up by the multiplication number f each time the level of the input signal input thereto from the input selecting module 41 varies in the predetermined direction, such as the low-to-high direction.

The angular counter 49c is operative to cause its count value to automatically follow the count value of the reference counter 49a in synchronization with an active edge, for example, rising edge of each clock pulse of the system clock.

The angle clock module 49 also includes first and second registers (REG) 49d and 49e. The first register 49d is operative to store therein an upper limit for the reference counter 49a and the angular counter 49c. The second register 49e is operative to store therein a mode value. The mode value determines the operation mode of the reference counter 49a.

The reference counter 49a is configured to:

count up the number of rising edges of the multiplication clock input thereto from the multiplication clock generating module 45; and reset its count value to zero (0) in response to the rising edge that appears in the multiplication clock after the count value reaches the upper limit stored in the first register 49d.

The reference counter 49a is also configured to execute the counting operation in one of the operation modes; this one of the operation modes is determined by the mode value stored in the second register 49e.

In the embodiment, the operation modes include:

disabling mode in which the reference counter 49a disables the counting-up after the count value reaches the count value of the guard counter 49b; and enabling mode in which the reference counter 49a enables the counting-up even after the count value reaches the count value of the guard counter 49b.

In the embodiment, the angular counter 49c is configured such that the count values thereof correspond to the rotational positions of the crankshaft CS when the rotational position thereof is represented with the resolution obtained by dividing the unit angle ($\Delta\theta$) degrees crank angle (6 degrees crank angle) by the 60 of the multiplication number f1; this resolution is determined to be "$6°/60=0.1°$ crank angle".

The microcomputer 30 includes a non-edge period measuring counter 30a with an initial count value of zero for measuring a non-edge period in the crank signal. The counter 30a can be installed as a hardware component or a software component in the microcomputer 30.

Next, various tasks to be executed by the CPU 31 of the microcomputer 30 in accordance with at least one of the programs stored in, for example, the flash ROM 37 will be described hereinafter with reference to FIGS. 5 to 16.

(1) Input Signal Diagnosing Task

First, instructions of an input signal diagnosing task program that allow the CPU 31 to repeatedly execute the input signal diagnosing task at regular intervals of Tc after the microcomputer 30 is booted will be described hereinafter with reference to FIG. 5.

When launching the input signal diagnosing task program, the CPU 31 determines whether an engine speed of the vehicle is equal to or greater than a predetermined value Na. If it is determined that the engine speed is less than the predetermined value Na (the determination in step S110 is NO), the microcomputer 13 exits the input-signal diagnosing task.

In step S110, the engine speed can be calculated by predetermined engine speed calculating operations using the crank signal. For example, the CPU 31 measures the time interval of the crank angle of 360 degrees corresponding to the occurrence cycle of the pulse-missing portions M, and calculates the engine speed based on the measured time interval.

The pulse-missing portions M can be detected in, for example, the following manner. Specifically, intervals between temporally adjacent active edges of the crank signal are measured, and when a current measured interval is equal to or greater than the product of a previous measured interval and a predetermined pulse-missing detecting ratio of, for example, 2, it is determined that the current measured interval corresponds to one of the pulse missing portions M.

Otherwise if it is determined that the engine speed is equal to or greater than the predetermined value Na (the determination in step S110 is YES), the CPU 31 proceeds to step S120. In step S120, the CPU 31 determines whether an active edge, such as a trailing edge, appears in the crank signal during a regular time interval Tc from the previous input-signal diagnosing task to this current input-signal diagnosing task.

If it is determined that an active edge (trailing edge) appears in the crank signal during the regular time interval Tc (the determination in step S120 is YES), the CPU 31 stores in, for example, the RAM 39 information representing that the crank signal is normal as the diagnosed result in step S130.

Subsequently, the CPU 31 clears the count value of the non-edge period measuring counter 30a in step S140, exiting the input-signal diagnosing task. The non-edge period measuring counter 30a is configured to be reset each time the microcomputer 30 is booted.

Specifically, the non-edge period measuring counter 30a serves as a counter designed to add up the number of times where it is determined that no rising edges appear in the crank signal in the following operations of the input-signal diagnosing task.

Otherwise if it is determined that no active trailing edges appear in the crank signal during the regular time interval Tc (the determination in step S120 is NO), the CPU 31 checks whether the count value of the non-edge period measuring counter 30a exceeds a predetermined value Nb of, for example, 10 in step S150.

If it is checked that the count value of the non-edge period measuring counter 30a does not exceed the predetermined value Nb (the checked result in step S150 is NO), the CPU 31 increments the count value of the non-edge period measuring counter 30a by 1, exiting the input-signal diagnosing task.

Otherwise if it is checked that the count value of the non-edge period measuring counter 30a exceeds the predetermined value Nb (the checked result in step S150 is YES), the CPU 31a stores in, for example, the RAM 39, information representing that the crank signal is abnormal as the diagnosed result in step S170, exiting the input-signal diagnosing task.

Figure 5:
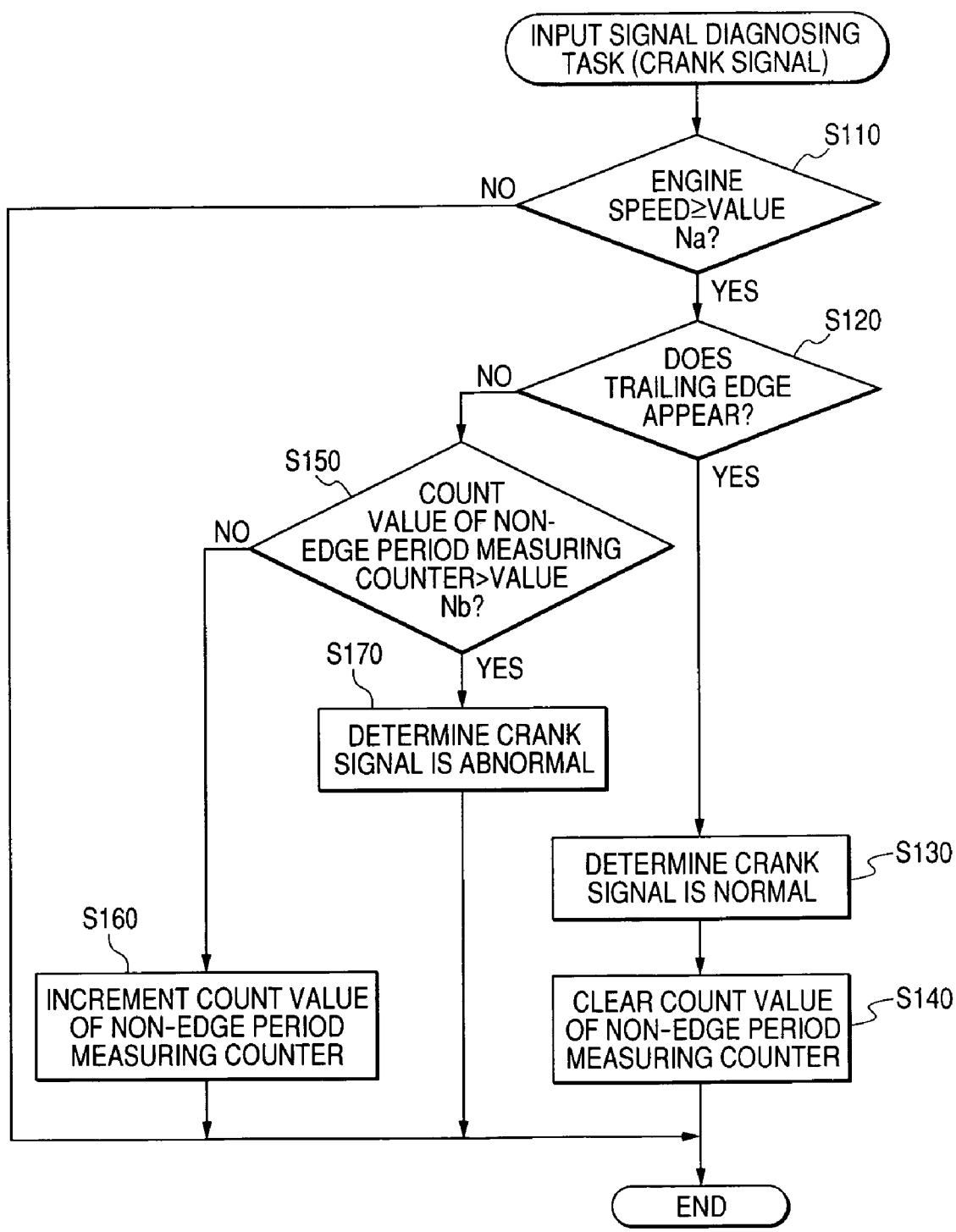
FIG. 5 is a flowchart schematically illustrating an input signal diagnosing task to be executed by a CPU illustrated in FIG. 1.

For example, in the input-signal diagnosing task illustrated in FIG. 5, it is assumed that the engine speed is equal to or greater than the predetermined value Na (the determination in step S110 is YES).

In this case, if no active trailing edges appear in the crank signal after a predetermined period of time has elapsed (the determination in steps S120 is NO and that in S150 is YES), the crank signal is determined to be abnormal (see step S170). Note that the predetermined period of time is represented as the product of the regular time interval Tc and the predetermined value Nb (Tc×Nb), and that an active trailing edge is supposed to appear in the crank signal during the predetermined period of time.

The CPU 31 carries out the input-signal diagnosing task illustrated in FIG. 5 for the first and second cam signals as in the case of the crank signal (see FIG. 5), thereby determining whether the first and second cam signals are normal. Because the instructions of the input-signal diagnosing task for the first and second cam signals are substantially identical to those for the crank signal, the descriptions of the instructions are omitted.

(2) Time-Synchronized Task

Second, instructions of a time-synchronized task program that allow the CPU 31 to repeatedly execute the time-synchronized task at regular intervals in parallel with the input-signal diagnosing task will be described hereinafter with reference to FIG. 6.

When launching the time-synchronized task program, the CPU 31 refers to the information stored in the RAM 39 and representing the diagnosed result for the crank signal (see steps S130 and S170 in FIG. 5), thereby determining whether the crank signal is abnormal based on the referred result in step S210.

If it is determined that the crank signal is normal (the determination in step S210 is NO), the CPU 31 proceeds to step S220. In step S220, the CPU 31 sends, to the input selecting module 41, a crank-signal selection instruction to select the crank signal as the input signal. In addition, in step S220, the CPU 31 sends, to each of the modules 43, 45, 47, and 49, the crank-signal selection instruction. Thereafter, the CPU 31 exits the time-synchronized task.

The crank-signal selection instruction received by the input selecting module 41 allows the module 41 to select the crank signal as the input signal, thereby passing the selected crank signal as the input signal to each of the modules 43, 45, 47, and 49

The crank-signal selection instruction received by the multiplication clock generating module 45 allows the module 45 to store, as the multiplication number f1, 60 for the crank signal in the second register 45b.

The crank-signal selection instruction received by the pass-angle measuring module 47 allows the module 47 to store in the threshold register 47b, as the threshold value, a value equivalent to the default given by $\Delta\theta \times 2.5$.

The crank-signal selection instruction received by the angle clock module 49 allows the module 49 to store, in the first register 49d, an upper limit of each of the reference counter 49a and the angular counter 49c; this upper limit is determined for the crank signal. Note that, in the embodiment, the upper limit for the crank signal is given by a value determined by dividing a 360 degrees crank angle corresponding to one rotation of the crankshaft CS by 0.1° CA resolution based on the angular counter 49c. That is, the upper limit for the crank signal is determined to be "360/0.1=3600".

Otherwise if it is determined that the crank signal is abnormal (the determination in step S210 is YES), the CPU 31 proceeds to step S230.

In step S230, the CPU 31 refers to the information stored in the RAM 39 and representing the diagnosed result for each of the first and second cam signals to determine whether at least one of the first and second cam signals is abnormal based on the referred result.

If it is determined that both the first and second cam signals are normal (the determination in step S230 is NO), the CPU 31 proceeds to step S240. In step S240, the CPU 31 sends, to the input selecting module 41, a cam-edge signal selection instruction to select the cam-edge signal as the input signal. In addition, in step S240, the CPU 31 sends, to each of the modules 43, 45, 47, and 49, the cam-edge signal selection instruction. Thereafter, the CPU 31 exits the time-synchronized task.

The cam-edge signal selection instruction received by the input selecting module 41 allows the module 41 to select the cam-edge signal as the input signal, thereby passing the selected cam-edge signal as the input signal to each of the modules 43, 45, 47, and 49

The cam-edge signal selection instruction received by the multiplication clock generating module 45 allows the module 45 to store, as the multiplication number f, a value for the cam-edge signal in the second register 45b. In the embodiment, the multiplication number f for the cam-edge signal will be specifically expressed by "f2" hereinafter.

The value as the multiplication number f2 for the cam-edge signal stored in the second register 45b is obtained by:

calculating the product of an angular interval of 120 degrees crank angle between arbitrary two temporally adjacent points P in the cam-edge signal and the multiplication number 60 for the crank signal; and dividing the obtained product by the unit angle of 6 degrees crank angle.

That is, the multiplication number f2 for the cam-edge signal is determined to be "(120×60)/6=1200".

The cam-edge signal selection instruction received by the angle clock module 49 allows the module 49 to store, in the first register 49d, an upper limit of each of the reference counter 49a and the angular counter 49c; this upper limit is determined for the cam-edge signal. Note that, in the embodiment, the upper limit for the cam-edge signal is given by a value determined by dividing 720 degrees crank angle corresponding to one rotation of the each of the first and second camshafts CM1 and CM2 by 0.1° CA resolution based on the angular counter 49c. That is, the upper limit for the cam-edge signal is determined to be "720/0.1=7200".

Note that, unlike in step S220, a threshold value is not stored in the threshold register 47b in step S240.

Otherwise if it is determined that at least one of the first and second cam signals is abnormal (the determination in step S230 is YES), the CPU 31 exits the time-synchronized task.

(3) Crank-Edge Interrupt Task

Third, instructions of a crank-edge interrupt task program will be described hereinafter with reference to FIG. 7. The instructions allow the CPU 31 to execute the crank-edge interrupt task each time an active edge appears in the crank signal output from the input selecting module 41 as the input signal (see step S220 in FIG. 6) after the microcomputer 30 is booted.

When an appearance of an active edge in the crank signal (input signal) triggers to launch the crank-edge interrupt task program, the CPU 31 determines whether the trigger active edge represents the end of a pulse-missing portion M in the crank signal in step S310.

Figure 8:
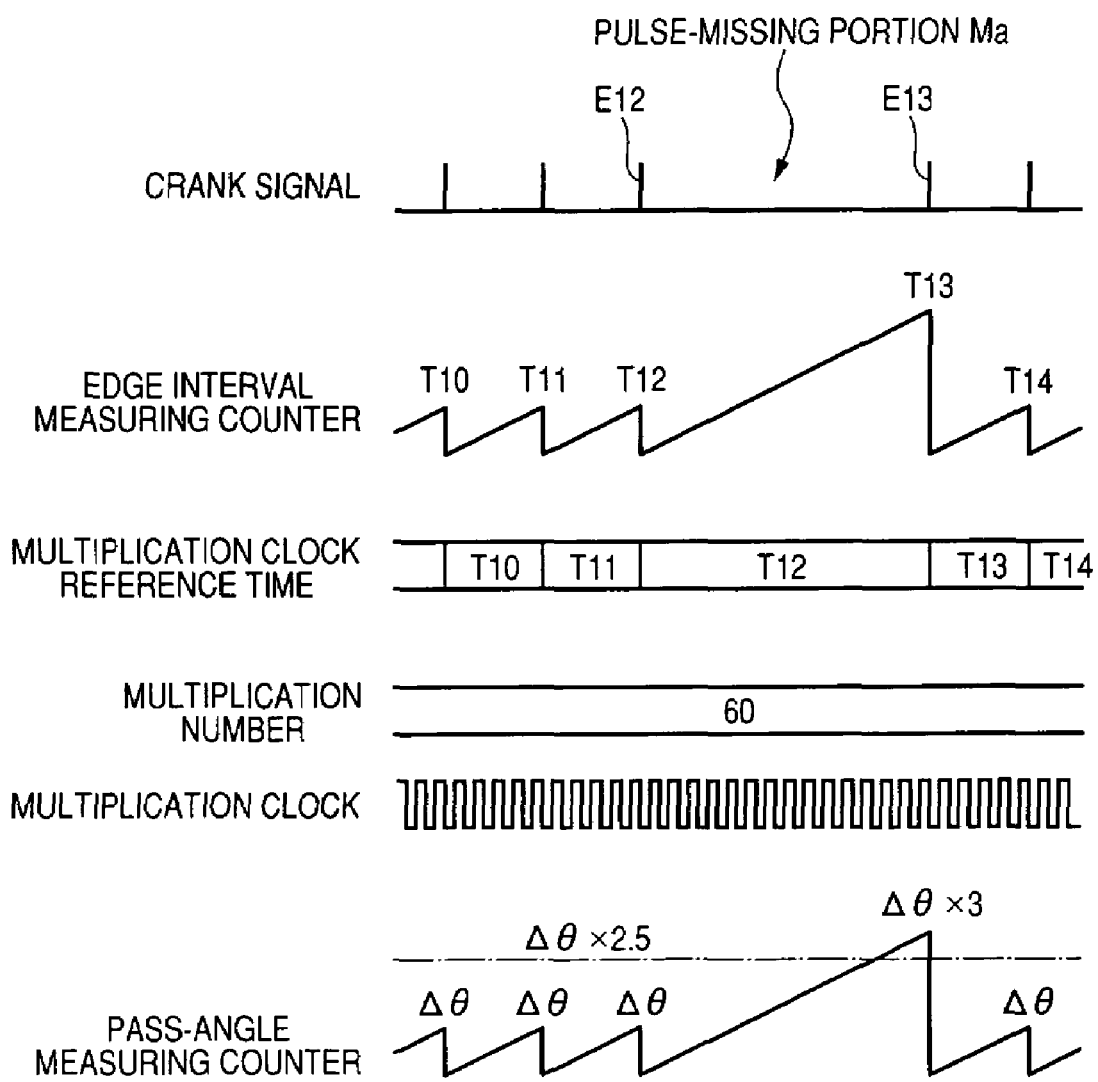
FIG. 8 is a time chart schematically illustrating variations of parameters of the angle clock generating unit with variation of the input signal according to the embodiment of the invention.

Note that, as illustrated in FIG. 8 for example, it is assumed that temporally adjacent active edges E12 and E13 in the crank signal constitute a pulse-missing portion Ma therein.

In this assumption, the time interval of the pulse-missing portion Ma between the active edges E12 and E13 corresponds to a measured count value T12 of the edge interval measuring counter 43a. Intervals between temporally adjacent active edges of other portions except for the pulse-missing portions M in the crank signal respectively correspond to measured count values T10, T11, T13, T14, . . .

As clearly seen in FIG. 8, the time interval of the pulse-missing portion Ma in the crank signal is longer than the intervals of the other portions except for the pulse-missing portions M therein. For this reason, the count value T12 corresponding to the time interval of the pulse-missing portion Ma in the crank signal is greater than the other count values each corresponding to one of the other portions therein.

As described above, a measured value (count value) of the pass-angle measuring counter 47a depends on a corresponding time interval between temporally adjacent same-directed edges in the crank signal. For this reason, a count value of the pass-angle measuring counter 47a corresponding to the time interval of the pulse-missing portion Ma in the crank signal is greater than that of the counter 47a corresponding to another time interval of one of the other portions in the crank signal.

In addition, the default (Δθ×2.5) of the threshold value stored in the threshold register 47b is greater than the reference count value that the pass-angle measuring counter 47a can reach while no pulse-missing portions M appear in the crank signal, and smaller than the specified count value that the counter 47a can reach while one of the pulse-missing portions M appears in the crank signal.

For this reason, the count value of the pass-angle measuring counter 47a corresponding to the time interval of the pulse-missing portion Ma in the crank signal exceeds the specified count value greater than the default (Δθ×2.5) of the threshold value stored in the threshold register 47b. For example, the count value of the pass-angle measuring counter 47a corresponding to the time interval of the pulse-missing portion Ma in the crank signal is illustrated by "Δθ×3" in FIG. 8.

As a result, when the count value of the pass-angle measuring counter 47a corresponding to the time interval of the pulse-missing portion Ma in the crank signal reaches the default of the threshold value, the pass-angle measuring module 47 generates an interrupt, thereby outputting it to the CPU 31.

Accordingly, when receiving the interrupt output from the pass-angle measuring module 47, the CPU 31 determines that the trigger active edge represents the end of a pulse-missing portion M in the crank signal (the determination in step S310 is YES).

Figure 9:
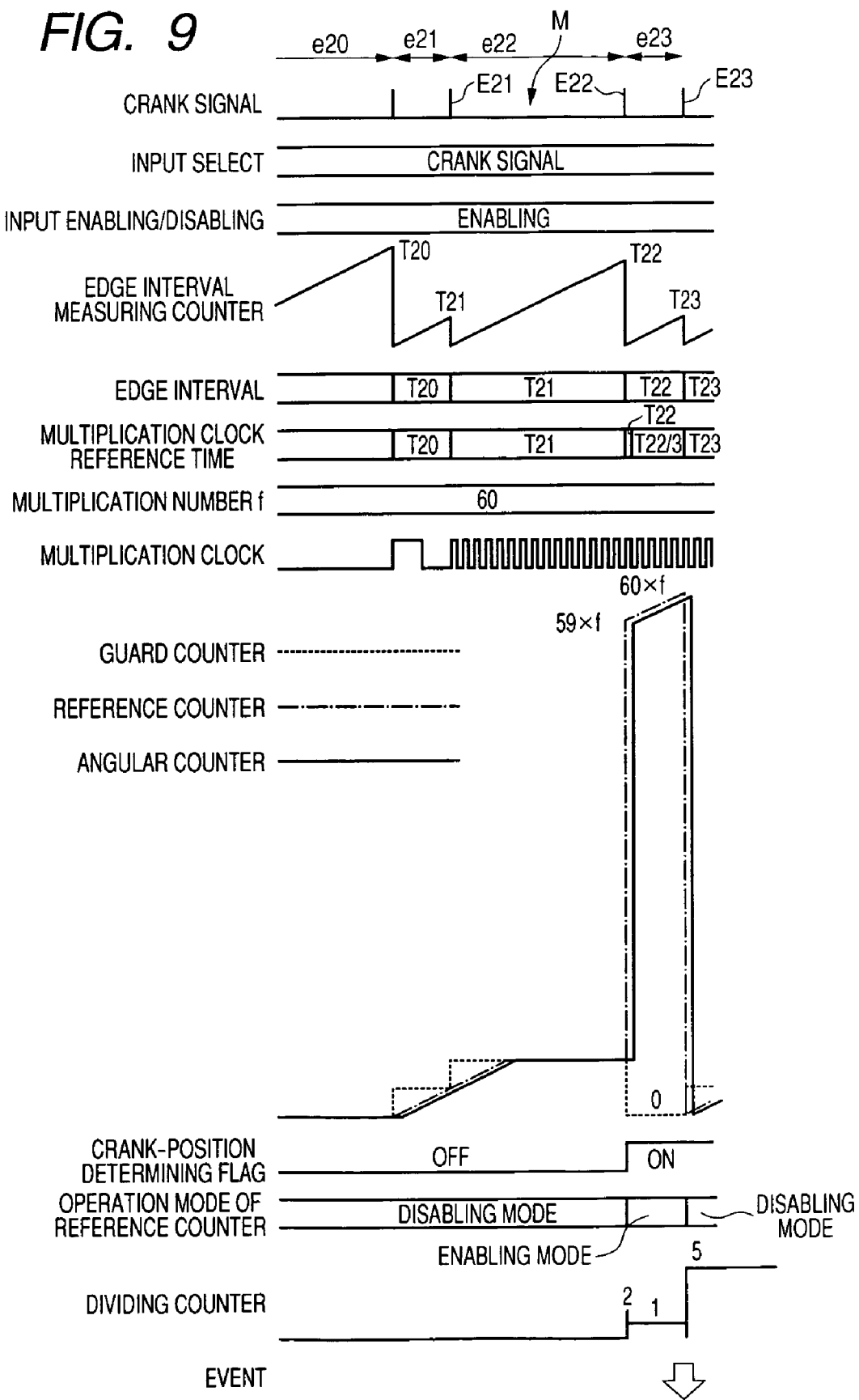
FIG. 9 is a time chart schematically illustrating variations of parameters of the angle clock generating unit with variation of the input signal during the crank-edge interrupt task illustrated in FIG. 7.

For example, as illustrated in FIG. 9, an active edge E22 is the trigger active edge representing the end of a pulse-missing portion M.

Subsequently, the CPU 31 determines whether a crank-position determining flag F1 holds information indicative of OFF in step S320. It is to be noted that the crank-position determining flag F1 is for example set by software in the microcomputer 30 each time the microcomputer 30 is booted. The information indicative of OFF is set as default information of the crank-position determining flag F1 during the microcomputer's start-up process.

If it is determined that the crank-position determining flag F1 holds the information indicative of the default of OFF (the determination in step S320 is YES), the CPU 31 determines a timing immediately after microcomputer startup, proceeding to step S330.

In step S330, the CPU 31 sets the product of "59" and the multiplication number f1, which is set to 60 in the crank-edge interrupt task, to the count value of the reference counter 49a. Similarly, in step 340, the CPU 31 sets the product of "59" and the multiplication number f1, which is set to 60 in the crank-edge interrupt task, to the count value of the angle counter 49c.

The product of "59" and the multiplication number f1 (60) to be set to the count value of the reference counter 49a allows the count value thereof to be cleared (zero) when the next active edge E23 appears in the crank signal. Similarly, the product of "59" and the multiplication number f1 (60) to be set to the count value of the angular counter 49c allows the count value thereof to be cleared (zero) upon an appearance of the next active edge E23 in the crank signal.

Next, the CPU 31 changes the information held by the crank-position determining flag F1 from OFF to ON in step S350.

After the completion of the execution of the instruction in step S350, or a negative determination representing that the crank-position determining flag F1 does not hold the information indicative of OFF in step S320, the CPU 31 sets "0" to the count value of the guard counter 49b in step S360.

The count value of zero (0) set to the guard counter 49b represents a count value that each of the reference counter 49a and the angular counter 49c should take when the next active edge E23 appears in the crank signal.

Specifically, it is assumed that the engine suddenly accelerates at the timing of an appearance of the active edge E22 in the crank signal so that the engine speed suddenly increases. In this assumption, a time interval between the active edge E22 and the next active edge E23 in the crank signal may become short as compared with normal time intervals of active edges therein. This may cause the count value of each of the reference counter 49a and the angular counter 49c not to catch up with zero (0) at the appearance timing of the next active edge E23; each of the counters 49a and 49b should take zero (0) at the appearance timing of the next active edge E23.

In this assumption, according to the embodiment, it is possible to forcibly increase the count value of each of the reference counter 49a and the angular counter 49c to be matched with the guard value of the guard counter 49b at the timing when the next active edge E23 appears in the crank signal. This permits the count value of each of the reference counter 49a and the angular counter 49c to become zero (0) even if a time interval between the active edge E22 and the next active edge E23 in the crank signal becomes short as compared with normal time intervals of active edges therein.

In addition, it is assumed that the engine suddenly decelerates at the timing of an appearance of the active edge E22 in the crank signal so that a time interval between the active edge E22 and the next active edge E23 in the crank signal becomes long as compared with normal time intervals of active edges therein. This may cause the count value of each of the reference counter 49a and the angular counter 49c to exceed, at the next active edge E23, zero (0) that each of the counters 49a and 49b should take at the next active edge E23.

In this assumption, according to the embodiment, it is possible to forcibly stop an increment of the count value of each of the reference counter 49a and the angular counter 49c when the count value reaches the guard value of the guard counter 49b. This permits the count value of each of the reference counter 49a and the angular counter 49c to become zero (0) even if a time interval between the active edge E22 and the next active edge E23 in the crank signal becomes long as compared with normal time intervals of active edges therein.

As described above, the guard counter 49b is configured such that its count value at a timing of an appearance of an active edge in the crank signal represents a value that each of the reference counter 49a and the angular counter 49c should take at a timing of an appearance of the next active edge in the crank signal. This permits the count value of each of the reference counter 49a and the angular counter 49c to be guarded even if the engine suddenly accelerates or decelerates.

After step S360, the CPU 31 sends, to the angle clock module 49, an instruction indicative of the enabling mode in step S370.

The instruction indicative of the enabling mode and received by the angle clock module 49 allows the module 49 to store, as the mode value, an enabling mode value indicative of the enabling mode in the second register 49e. The enabling mode value stored in the second register 49e permits the reference counter 49a to count in the enabling mode described above even if "0" is set to the count value of the guard counter 49b.

Subsequently, the CPU 31 sends, to the multiplication clock generating module 45, an instruction to correct a multiplication-clock reference time stored in the first register 45a in step S380.

Specifically, the instruction is to set, as the multiplication-clock reference time to be stored in the first register 45a, a value calculated by dividing the count value (measured interval) passed from the edge interval measuring module 43 by a predetermined value.

When receiving the instruction, the multiplication clock generating module 45 works to:

divide, by the predetermined value, the count value passed at a timing from the edge interval measuring module 43; this timing is synchronized with an appearance of an active edge in the crank signal immediately after the reception of the instruction; and store a value calculated by the division in the first register 45a as a corrected multiplication-clock reference time.

Specifically, as illustrated in FIG. 9, the count value corresponding to a time interval, such as a T22, of a pulse-missing portion M in the crank signal is k-times as much as that corresponding to a time interval, such as a T21, of one of the other portions except for the pulse-missing portion M therein. It is to be noted that the width of the time interval "T1" longer than that of the time interval "T2", which is illustrated as "EDGE INTERVAL TIME" in FIG. 9 is independent of the length of the time interval "T1". Specifically, the length of the time interval "T2" is longer than that of the time interval "T1" in FIG. 13.

In the embodiment, therefore, the predetermined value is set to k representing a ratio of a time interval between active edges of a pulse-missing portion M in the crank signal to that between active edges of another portion therein; this k is set to 3.

This allows each of the multiplication clock reference times to be substantially constant, so that the multiplication clock whose clock cycle is substantially constant (see "multiplication clock" in FIG. 9).

Next, the CPU 31 sets "2" to a count value of a dividing counter C1 in step S390, proceeding to step S430. For example, the CPU 31 can operate the dividing counter C1 by software (at least one of the programs). An initial value of the dividing counter C1 is set to "0".

Otherwise if it is determined that the trigger active edge does not represent the end of a pulse-missing portion M in the crank signal (the determination in step S310 is NO), the CPU 31 determines whether the trigger active edge represents the head of a pulse-missing portion M in step S400.

In the first embodiment, the CPU 31 executes the determination in step S400 by, for example, determining whether the count value of the angular counter 49c represents a rotational position of the crankshaft CS corresponding to the head of a teeth-missing portion 11c. If it is determined that the count value of the angular counter 49c represents the rotational position of the crankshaft CS corresponding to the head of a teeth-missing portion 11c, the CPU 31 determines that the trigger active edge represents the head of a pulse-missing portion M in step S400.

Specifically, if it is determined that the trigger active edge represents the head of a pulse-missing portion M (the determination in step S400 is YES), the CPU 31 sets the product of "59" and the multiplication number f1, which is set to 60 in the crank-edge interrupt task, to the count value of the guard counter 49b in step S410.

This is because the count value of the reference counter 49a and the angular counter 49c should take the product of "59" and the multiplication number f1 (60) when the next active edge corresponding to the end of a pulse-missing portion M appears in the crank signal.

After the completion of the execution of the instruction in step S410, or a negative determination in step S400, the CPU 31 sends, to the angle clock module 49, an instruction indicative of the disabling mode in step S420. Then, the CPU 31 proceeds to step S430.

The instruction indicative of the disabling mode and received by the angle clock module 49 allows the module 49 to store, as the mode value, a disabling mode value indicative of the disabling mode in the second register 49e. The disabling mode value stored in the second register 49e permits the reference counter 49a to count in the disabling mode described above.

In step S430, the CPU 31 determines whether the crank-position determining flag F1 holds the information indicative of ON.

If it is determined that the crank-position determining flag F1 holds the information indicative of ON (the determination in step S430 is YES), the CPU 31 decrements the count value of the dividing counter C1 by 1 in step S440, proceeding to step S450.

In step S450, the CPU 31 checks whether the count value of the dividing counter C1 is set to "0".

If it is checked that the count value of the dividing counter C1 is set to "0" (the determination in step S450 is YES), the CPU 31 goes to step S460. In step S460, the CPU 31 generates an event that determines an activation timing for one of the individual control targets associated with engine control, such as an injector and/or an igniter for a corresponding one of the individual cylinders.

In parallel to the crank-edge interrupt task, the CPU 31 according to the embodiment is programmed to:

compute a proper standby period and a proper active period for each of the individual control targets based on the measurement signals input from the input circuit 10; and set the computed standby and active periods for a corresponding one of the control targets to respective count values of the first and second timers of the timer output unit 35 each time the event is generated by the crank-edge interrupt task.

When the count values are set to the first and second timers for a corresponding one of the control targets, the timer output unit 35 works to:

stand by for outputting the active time for a corresponding one of the control targets until the standby period therefor has elapsed based on the count value of the first timer; and output, to the output circuit 20, an instruction to activate a corresponding one of the control targets for the activate period therefor based on the count value of the second timer.

The output circuit 20 works to:

receive the instruction for a corresponding one of the control targets; and activate a corresponding one of the control targets for the activate period therefor based on the received instruction.

After the completion of the execution of the instruction in step S460, the CPU 31 sets, for example, "5" to the count value of the dividing counter C1 in step S470. "5" to be set to the count value of the dividing counter C1 allows the CPU 31 to output an event at regular intervals of 30 degrees crank angle. The regular intervals of 30 degrees crank angle will be referred to as "event intervals" hereinafter.

After the completion of the execution of the instruction in S470, a negative determination representing that the crank-position determining flag F1 is set to ON in step S430, or a negative determination representing that the count value of the dividing counter C1 is different from "0" in step S450, the CPU 31 exits the crank-edge interrupt task.

Specific operations of the respective modules 41, 43, 45, 47, and 49 under control of the CPU 31 and variations of the parameters, such as the count values of the counters 43a, 49a, 49b, and 49c, will be described hereinafter with reference to FIGS. 7, 9, and 10.

Immediately after the microcomputer 30 is booted (see a section e20 in FIG. 9), the pass-angle measuring module 47 does not normally operate and the angular counter 49c does not execute counting operation. For this reason, the determinations in step S310 and S400 are respective negative, so that execution of the CPU 31 is shifted to the instruction in step S430 via that in step S420.

At that time, because the crank-position determining flag F1 holds the information indicative of OFF as the default information, the determination in step S430 is NO, so that the crank-edge interrupt task is exited.

Thereafter, the instructions in step S310, S400, S420, and S430 are repeatedly executed by the CPU 31 in this order each time an active edge appears in the crank signal (see a section e21 in FIG. 9).

During the repeat execution of the instructions in steps S310, S400, S420, and S430, the count value of the pass-angle measuring counter 47a exceeds the threshold value stores in the threshold register 47b before an active edge E22 appearing in the crank signal represents the end of a pulse-missing portion M (see in FIG. 8). During the repeat execution of the instructions in steps S310, S400, S420, and S430, it is to be noted that, because the count value of the angular counter 49c does not represent the head of a pulse-missing portion M, the determination in step S400 is negative.

In FIG. 8, for example, a reference character E13 is assigned to an active edge appearing in the crank signal represents the end of a pulse-missing portion M.

This allows the pass-angle measuring module 47 to generate an interrupt, and to output it to the CPU 31. Thus, the interrupt is received by the CPU 31 so that, when the active edge E22 appears in the crank signal after receipt of the interrupt, it is determined that the active edge E22 represents the end of a pulse-missing portion M in the crank signal (the determination in step S310 is YES). Thus, execution of the CPU 31 is shifted to step S320 and later.

At that time, because the crank-position determining flag F1 is set to the information indicative of OFF, the determination in step S320 is affirmative, so that execution of the CPU 31 is shifted to step S330.

In step S330, the count value of the reference counter 49a is set to the product of "59" and the multiplication number f1 (60), and the count value of the angular counter 49c is set to the product of "59" and the multiplication number f1 (60) in step S340. Thereafter, the crank-position determining flag F1 is set to the information indicative of ON in step S350.

Next, in step S360, the count value of the guard counter 49b is set to "0", and the reference counter 49a executes the count-up operation in the enabling mode in step S370.

Even if the count value of the guard counter 49b is set to "0" in step S360, because the operating mode of the reference counter 49a is set to the enabling mode in step S370, the reference counter 49a continuously counts up until the count value reaches the upper limit stored in the first register 49d (see a section e23 in FIG. 9).

Next, the multiplication-clock reference time is corrected from T22 to T22/3 in step S380 (see "T22/3" in FIG. 9), and thereafter, execution of the CPU 31 is shifted to step S430. At the shift timing, because the crank-position determining flag F1 is set to the information indicative of ON, the determination in step S430 is YES, so that the dividing counter C1 is decremented by 1 in step S440.

The decrement allows the count value of the dividing counter C1 to be turned from "2" set in step S390 immediately before step S430 to "1". At that time, because the count value of the dividing counter C1 dose not become "0", the determination in step S450 is NO, so that the crank-edge interrupt task is exited.

When the next active edge E23 appears in the crank signal corresponding to the rotation of the crankshaft CS by Δθ degrees crank angle (see FIG. 9), the count value of each of the reference counter 49a and the angular counter 49c is incremented from the product of "59" and the multiplication number f1 (60) to the product of "60" and the multiplication number f1 (60). The product of "60" and the multiplication number f1 (60) is matched with the upper limit of each of the reference counter 49a and the angular counter 49c stored in the first register 49d. For this reason, the count value of each of the reference counter 49a and the angular counter 49c is cleared (zero) in synchronization with the active edge E23 appearing in the crank signal (see FIG. 9).

In addition, when the next active edge E23 appears in the crank signal corresponding to the rotation of the crankshaft CS by $\Delta\theta$ degrees crank angle, the determinations in step S310 and S400 are respectively negative, so that the operation mode of the reference counter 49a is returned from the enabling mode to the disabling mode in step S420.

Thereafter, at that time, because the crank-position determining flag F1 is set to the information indicative of ON, the determination in step S430 is YES, so that the dividing counter C1 is decremented by 1 in step S440.

The decrement allows the count value of the dividing counter C1 to be turned from "1" set in step S440 to "0". Because the count value of the dividing counter C1 becomes "0", the determination in step S450 is YES, so that events that determine activation timings for the individual control targets associated with engine control are generated in step S460. Thereafter, the count value of the dividing counter C1 is set to "5" in step S470, the crank-edge interrupt task is exited.

As described above, after the affirmative determination in which an active edge represents the end of a pulse-missing portion M in the crank signal after microcomputer startup in step S310, the instructions in step S310, S400, and S420 to S470 are repeatedly executed by the CPU 31 in this order each time an active edge appears in the crank signal. The repeat execution of the instructions in step S310, S400, and S420 to S470 is stopped at step S400 when an active edge appearing in the crank signal represents the head of a pulse-missing portion M therein (see a section e24 in FIG. 10).

When an active edge (E25) (see FIG. 10) appearing in the crank signal represents the head of a pulse-missing portion M therein (the determination in step S400 is YES), the count value of the guard counter 49b is set to the product of "59" and the multiplication number f1 (60) in step S410. Thereafter, the instructions S420 to S470 are executed by the CPU 31 (see a section e25 in FIG. 10).

Thereafter, when the next active edge (E26) appears in the crank signal, it is determined that the active edge (E26) represents the end of the pulse-missing portion (the determination in step S310 is YES). At that time, because the crank-position determining flag F1 is set to the information indicative of ON, the determination in step S320 is NO, so that execution of the CPU 31 is shifted to step S360.

Figure 10:
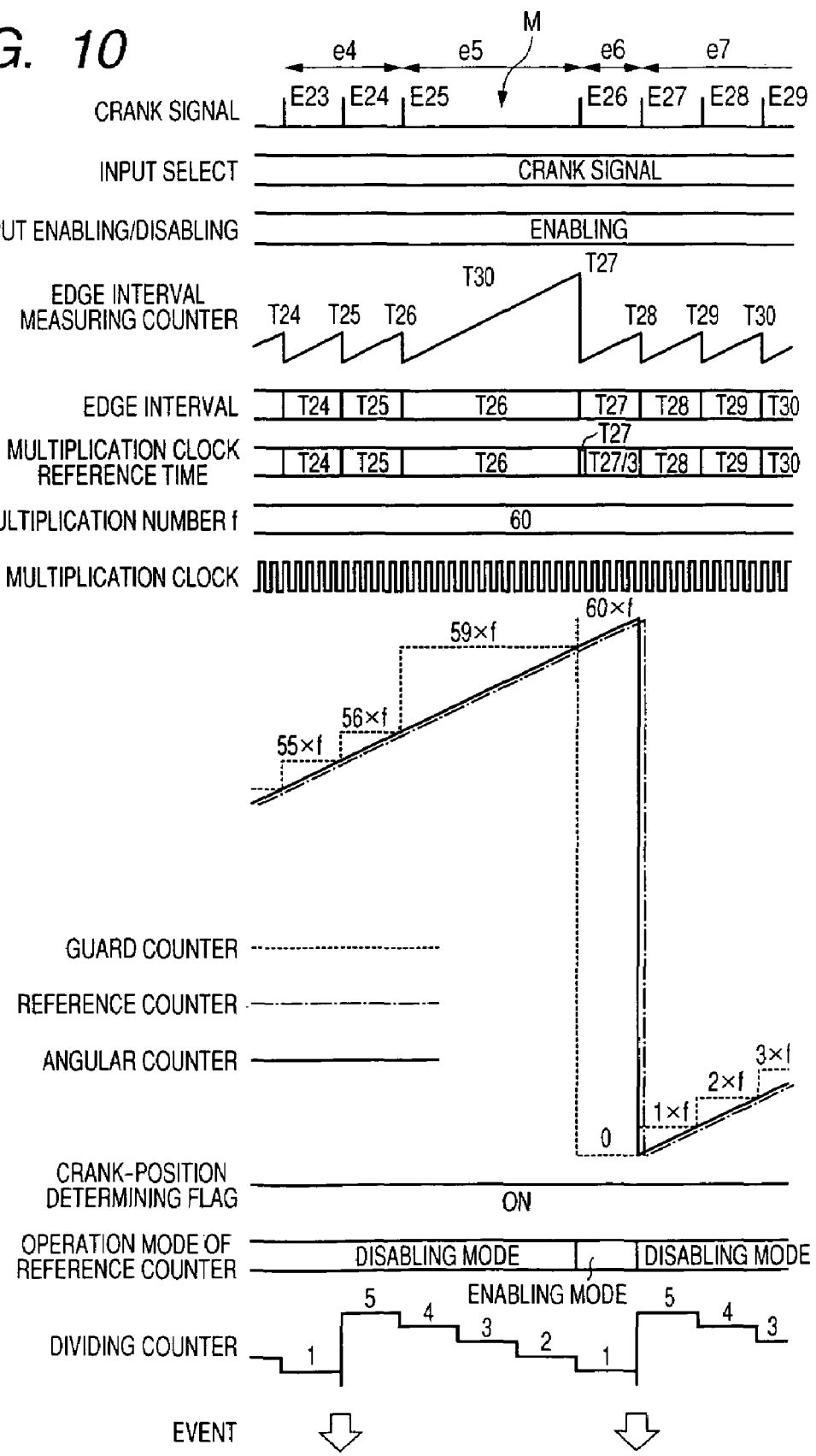
FIG. 10 is a time chart schematically illustrating variations of parameters of the angle clock generating unit with variation of the input signal during the crank-edge interrupt task illustrated in FIG. 7.

Thereafter, as described above, the reference counter 49a continuously counts up with the count value of the guard counter 49b unchanged until the count value of the reference counter 49a is cleared (zero) (see a section e26 in FIG. 10). Thereafter, as described above, the instructions in steps S310, S400, and S420 to S470 are repeatedly executed by the CPU 31 until it is determined that an active edge appearing in the crank signal represents the head of a pulse-missing portion M (see a section e27 in FIG. 10).

(4) Cam-Edge Interrupt Task

Fourth, instructions of a cam-edge interrupt task program will be described hereinafter with reference to FIG. 11. The instructions allow the CPU 31 to execute the cam-edge interrupt task each time an active edge appears in the cam-edge signal output from the input selecting module 41 as the input signal (see step S240 in FIG. 6) after the microcomputer 30 is booted.

When an appearance of an active edge in the cam-edge signal (input signal) triggers to launch the cam-edge interrupt task program, the CPU 31 determines whether a cam-position determining flag F2 holds information indicative of OFF in step S510. It is to be noted that the cam-position determining flag F2 is for example set by software in the microcomputer 30 each time the microcomputer 30 is booted. The information indicative of OFF is set as default information of the cam-position determining flag F2 during the microcomputer's start-up process.

If it is determined that the cam-position determining flag F2 holds the information indicative of the default of OFF (the determination in step S510 is YES), the CPU 31 determines a timing immediately after microcomputer startup, proceeding to step S520.

In step S520, the CPU 31 determines whether the count value of the guard counter 49b is equal to or greater than two-times the multiplication number f2, which is set to 1200 in the cam-edge interrupt task in the second register 45b described above. In other words, the CPU 31 determines whether the count value of the guard counter 49b is equal to or greater than 2400 (=2×1200). As a default, the count value of the guard counter 49b is set to "0".

If it is determined that the count value of the guard counter 49b is equal to or greater than two-times the multiplication number f2 (the determination in step S520 is YES), the CPU 31 proceeds to step S530.

In step S530, the CPU 31 sets initial values to the respective count values of the reference counter 49a, the guard counter 49b, and the angular counter 49c in step S530.

Specifically, in the embodiment, it is determined in advance that each active edge in the cam-edge signal corresponds to:

which of the first and second cam signals; and which of rising and trailing edges in any one of the first and second cam signals; and which of the high and low levels of the other of the first and second cam signals.

Moreover, in the embodiment, initial values to be stored in the reference counter 49a are determined beforehand for the respective active edges in the cam-edge signal. Similarly, initial values to be stored in the guard counter 49b are determined beforehand for the respective active edges in the cam-edge signal, and initial values to be stored in the angular counter 49c are determined beforehand for the respective active edges in the cam-edge signal.

Figure 12:
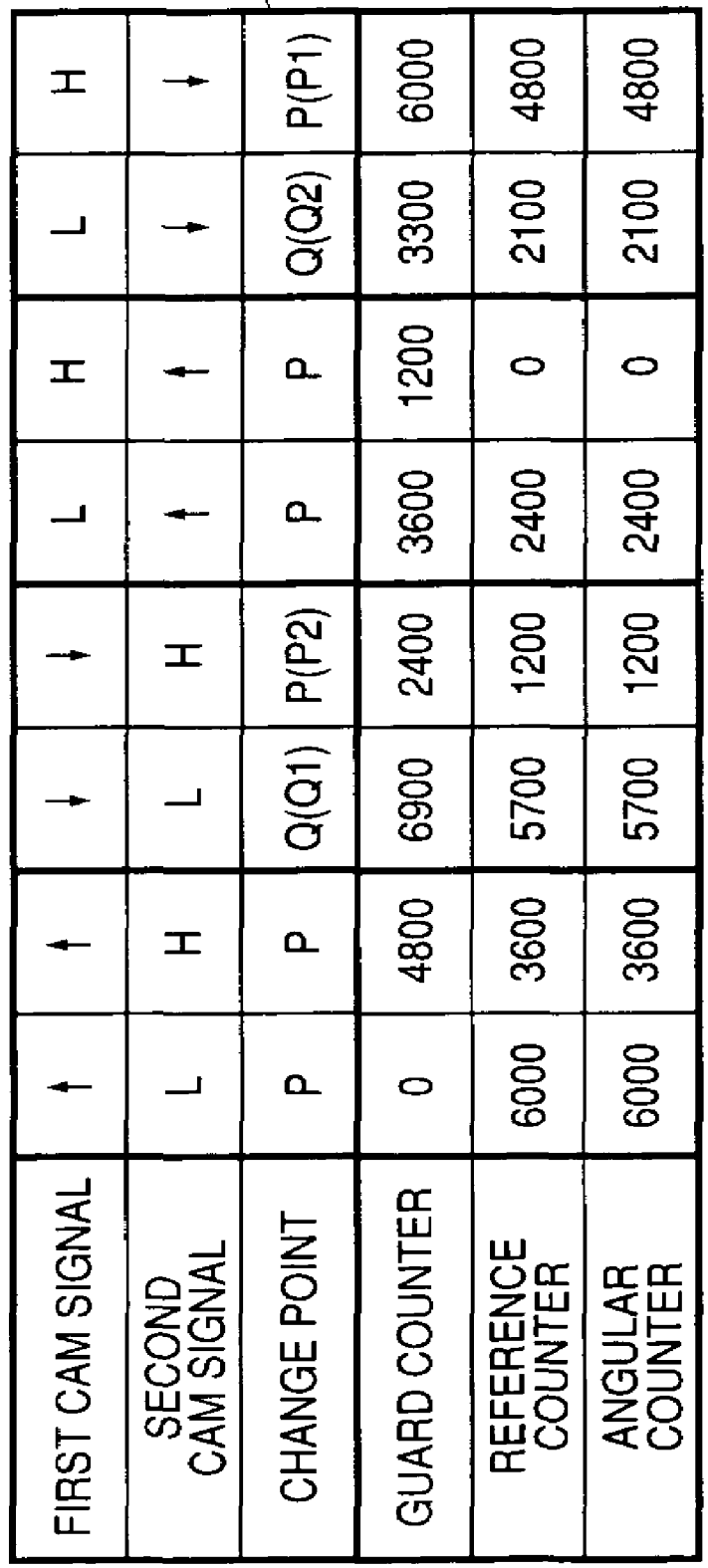
FIG. 12 is a table schematically illustrating correspondences between individual initial values of respective counters of angle clock module illustrated in FIG. 3 and individual active edges in the cam-edge signal in a table format according to the embodiment.

FIG. 12 schematically illustrates correspondences between the individual initial values of the respective counters 49a to 49c and the individual active edges in the cam-edge signal in a table format.

Specifically, when an active edge appearing in the cam-edge signal corresponds to a rising edge in the first cam signal while the second cam signal is in the low level at one of the change points P, the initial values of the counters 49a, 49b, and 49c are respectively set to "6000", "0", and "6000".

When an active edge appearing in the cam-edge signal corresponds to a rising edge in the first cam signal while the second cam signal is in the high level at one of the change points P, the initial values of the counters 49a, 49b, and 49c are respectively set to "3600", "4800", and "3600".

When an active edge appearing in the cam-edge signal corresponds to a trailing edge in the first cam signal while the second cam signal is in the low level at one of the change points Q, the initial values of the counters 49a, 49b, and 49c are respectively set to "5700", "6900", and "5700".

When an active edge appearing in the cam-edge signal corresponds to a trailing edge in the first cam signal while the second cam signal is in the high level at one of the change points P, the initial values of the counters 49a, 49b, and 49c are respectively set to "1200", "2400", and "1200".

In addition, when an active edge appearing in the cam-edge signal corresponds to a rising edge in the second cam signal while the first cam signal is in the low level at one of the change points P, the initial values of the counters 49a, 49b, and 49c are respectively set to "2400", "3600", and "2400".

When an active edge appearing in the cam-edge signal corresponds to a rising edge in the second cam signal while the first cam signal is in the high level at one of the change points P, the initial values of the counters 49a, 49b, and 49c are respectively set to "0", "1200", and "0".

When an active edge appearing in the cam-edge signal corresponds to a trailing edge in the second cam signal while the first cam signal is in the low level at one of the change points Q, the initial values of the counters 49a, 49b, and 49c are respectively set to "2100", "3300", and "2100".

When an active edge appearing in the cam-edge signal corresponds to a trailing edge in the second cam signal while the first cam signal is in the high level at one of the change points P, the initial values of the counters 49a, 49b, and 49c are respectively set to "4800", "6000", and "4800".

It is to be noted that "rising edge" and "trailing edge" are respectively represented by the mark "↑" and the mark "↓" in FIG. 12, and that "low level" and "high level" are respectively represented by the characters "L" and "H" in FIG. 12.

In the embodiment, for example, data indicative of the correspondences between the individual initial values of the respective counters 49a to 49c and the individual active edges in the cam-edge signal are stored in advance in a table T. Moreover, the table T is for example stored beforehand in the flash ROM 37.

Specifically, in step S530, the CPU 31 references the data of the table T to read out initial values for the respective counters 49a to 49c; these readout initial values correspond to a current active edge appearing in the cam-edge signal. Then, the CPU 31 stores the readout initial values in the corresponding counters 49a to 49c, respectively in step S530.

Thereafter, the CPU 31 changes the information held by the cam-position determining flag F2 from OFF to ON in step S540, proceeding to step S570.

Otherwise if it is determined that the count value of the guard counter 49b is smaller than two-times the multiplication number f2 (the determination in step S520 is NO), the CPU 31 proceeds to step S570 while skipping the instructions in steps S550 and S560.

Otherwise if it is determined that the cam-position determining flag F2 holds the information indicative of ON (the determination in step S510 is NO), the CPU 31 shifts to step S550.

In step S550, the CPU 31 determines whether the count value of the guard counter 49b is equal to or greater than the product of the multiplication number f2 (1200) and the number of cylinders, which is 6 in the embodiment. In other words, the CPU 31 determines whether the count value of the guard counter 49b is equal to or greater than 7200 (=6×1200).

If it is determined that the count value of the guard counter 49b is equal to or greater than the product of the multiplication number f2 (1200) and the number (6) of cylinders (the determination in step S550 is YES), the CPU 31 goes to step S560. In step S560, the CPU 31 sets "0" to the count value of the guard counter 49b in step S560, proceeding to step S570.

Otherwise if it is determined that the count value of the guard counter 49b is smaller than the product of the multiplication number f2 (1200) and the number (6) of cylinders (the determination in step S550 is NO), the CPU 31 goes to step S570 while skipping the instruction in step S560.

In step S570, the CPU 31 checks whether the count value of the guard counter 49b is "0".

If it is determined that the count value of the guard counter 49b is set to "0" (the determination in step S570 is YES), the CPU 31 sends, to the angle clock module 49, an instruction indicative of the enabling mode in step S580 similar to step S370. This allows the reference counter 49a to count in the enabling mode described above even if "0" is set to the count value of the guard counter 49b.

Otherwise if it is determined that the count value of the guard counter 49b is different from "0" (the determination in step S570 is NO), the CPU 31 sends, to the angle clock module 49, an instruction indicative of the disabling mode in step S590 similar to step S420. This permits the reference counter 49a to count in the disabling mode described above.

After the establishment of the operating mode of the reference counter 49a in step S580 or S590, the CPU 31 determines whether the trigger active edge represents a change point immediately before a change point Q in step S600. In other words, the CPU 31 determines whether the trigger active edge represents an active edge whose next active edge corresponds to a change point Q in step S600.

Figure 13:
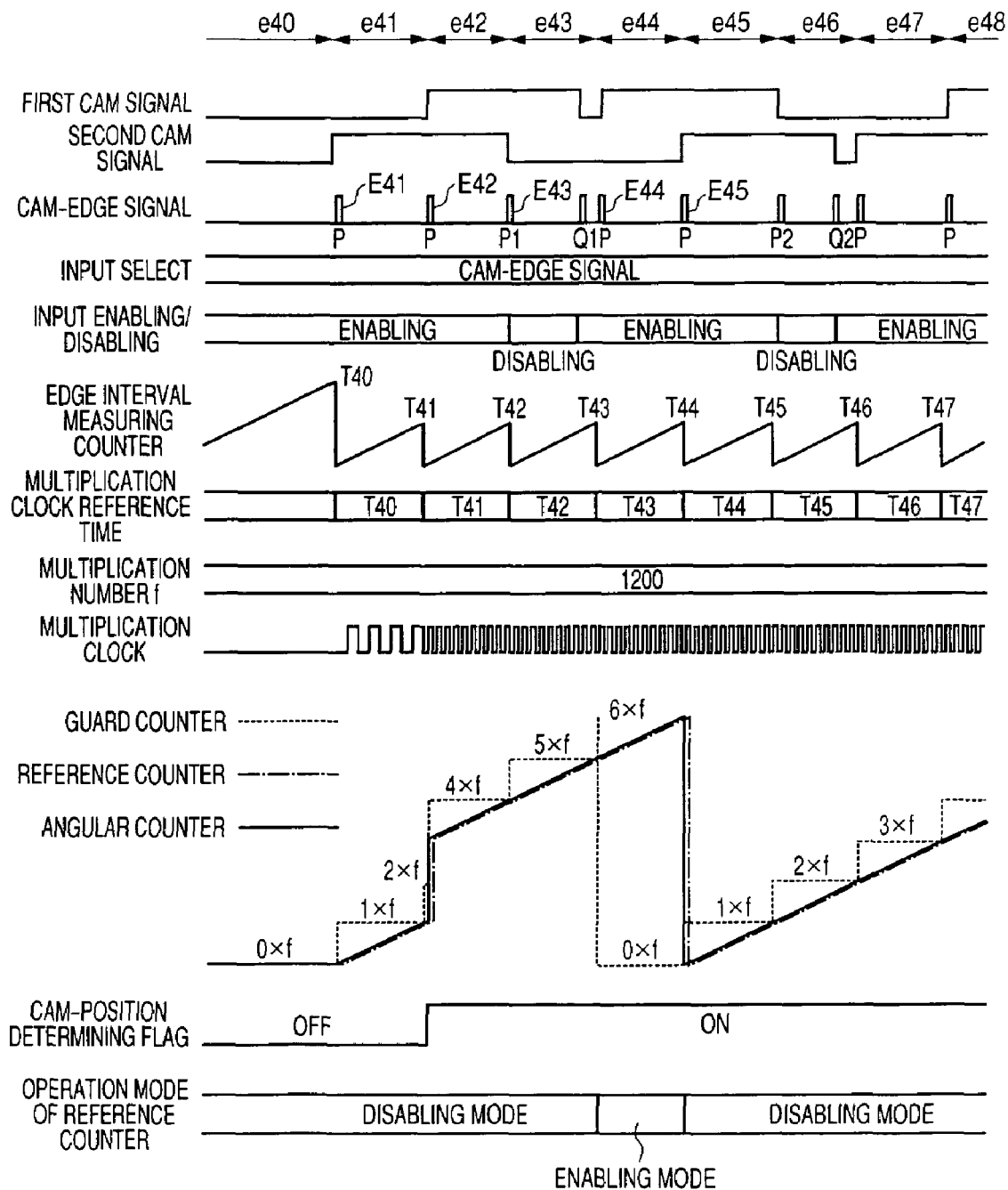
FIG. 13 is a time chart schematically illustrating variations of parameters of the angle clock generating unit with variation of the input signal during the cam-edge interrupt task illustrated in FIG. 11.

In the embodiment, as illustrated in FIGS. 2, 12, and 13, the change points Q consist of:

a change point Q1 at which the level of the first cam signal transiently changes in the high-to-low direction while the second cam signal is in the low level; and a change point Q2 at which the level of the second cam signal transiently changes in the high-to-low direction while the first cam signal is in the low level.

Thus, a change point P1 at which the level of the second cam signal transiently changes in the high-to-low direction while the first cam signal is in the high level is a change point immediately before the change point Q1. Similarly, a change point P2 at which the level of the first cam signal transiently changes in the high-to-low direction while the second cam signal is in the high level is a change point immediately before the change point Q2.

For example, in step S600, the CPU 31 references the data of the table T to determine whether the trigger active edge represents a change point immediately before a change point Q based on the result of the reference.

If it is determined that the trigger active edge represents a change point immediately before a change point Q (the determination in step S600 is YES), the CPU 31 proceeds to step S610. In step S610, the CPU 31 sends, to the input selecting module 41, an instruction to rewrite the at least one bit data stored in the register 41b into "0" from the default of "1".

The data "0" prevents the input selecting module 41 from passing the crank signal and the cam-edge signal to the modules 43, 45, 47, and 49.

Otherwise if it is determined that the trigger active edge does not represent a change point immediately before a change point Q (the determination in step S600 is NO), the CPU 31 proceeds to step S620. In step S620, the CPU 31 holds the default "1" of the at least one bit data unchanged, which allows the input selecting module 41 to continuously pass the crank signal and the cam-edge signal to the modules 43, 45, 47, and 49.

After the establishment of the operating state of the input selecting module 41 in step S610 or S620, the CPU 31 determines whether the cam-position determining flag F2 holds the information indicative of ON and the trigger active edge does not correspond to a change point Q in step S630.

If it is determined that either the cam-position determining flag F2 holds the information indicative of OFF or the trigger active edge corresponds to a change point Q (the determination in step S630 is NO), the CPU 31 exits the cam-edge interrupt task.

Otherwise if it is determined that the cam-position determining flag F2 holds the information indicative of ON and the trigger active edge does not correspond to a change point Q (the determination in step S630 is YES), the CPU 31 goes to step S640.

In step 640, the CPU 31 checks whether a count value of an event counter C2 is greater than "0". For example, the CPU 31 can operate the event counter C2 by software (at least one of the programs). In the embodiment, the CPU 31 sets, as a default, "0" to the count value of the event counter C2.

If it is determined that the count value of the event counter C2 is greater than "0" (the determination in step S640 is YES), the CPU 31 goes to step S660 while skipping the instruction in step S650.

In step S660, the CPU 31 stores a threshold value in the threshold register 47b. In the embodiment, the threshold value for the cam-edge interrupt task to be stored in the threshold register 47b is obtained based on:

a rotational angle of each of the first and second camshafts CM1 and CM2 from a change point P required to generate an event;

angular intervals at which the rotational position of each of the first and second camshafts CM1 and CM2 reaches one of TDCs of the individual cylinders; and the multiplication number f2 (1200).

The rotational angle of each of the first and second camshafts CM1 and CM2 from a change point P required to generate an event is determined to be "15 degrees crank angle" in the embodiment; this rotational angle will be referred to as "event generation interval".

The angular intervals at which the rotational position of each of the first and second camshafts CM1 and CM2 reaches one of TDCs of the individual cylinders is determined to be "120 degrees crank angle in the embodiment; this angular intervals will be referred to as "TDC angle".

Specifically, the threshold value for the cam-edge interrupt task is determined to be "15/(120/1200)=15×(1200/120)= 150". The threshold value "150" is stored in the threshold register 47b in step S660.

It is to be noted that, at the point of time when the execution of the instruction in step S660 is completed, the count value of the pass-angle measuring counter 47a represents the number of active edges, such as rising edges of the multiplication clock pulses of the multiplication clock between two temporally adjacent active edges of the cam-edge signal (input signal) at the respective change points P. The number of active edges (riding edges) of the multiplication clock pulses represents a rotation angle of each of the first and second camshafts CM1 and CM2 between two temporally adjacent active edges of the cam-edge signal (input signal) at the respective change points P.

Thereafter, the CPU 31 rewrites the information stored in the enabling/disabling register 47c from the information indicative of "disabling" to information indicative of "enabling" in step S670. The information indicative of "enabling" permits the CPU 31 to launch a pass-angle interrupt task (a pass-angle interrupt program) described hereinafter in response to receiving an interrupt passed from the pass-angle measuring module 47. In contrast, the information indicative of "disabling" prevents the CPU 31 from launching the pass-angle interrupt task.

Next, the CPU 31 sets an event value to the event counter C2 in step S680. In the embodiment, the event value is given by dividing the TDC angle (120° CA) by the event interval (30° CA), which is determined to be "120/30"=4. The event value "4" is stored in the event counter C2 in step S680. After completion of execution of the instruction in step S680, the CPU 31 exits the cam-edge interrupt task.

Next, specific operations of the respective modules 41, 43, 45, 47, and 49 under control of the CPU 31 and variations of the parameters, such as the count values of the counters 43a, 49a, 49b, and 49c, will be described hereinafter with reference to FIGS. 11 and 13.

When the cam-edge interrupt program is launched first in response to a trigger active edge in the cam-edge signal (see E41 in FIG. 13), the cam-position determining flag holds the information indicative of the default of OFF and the count value of the guard counter 49b is incremented by 1×f from the default of "0" (see sections e40 and e41 in FIG. 13). For this reason, the determination in S510 is affirmative and the determination in step S520 is negative, so that execution of the CPU 31 is shifted to the instruction in step S570.

Because the count value of the guard counter 49b is set to "1×f", which is not to "0", the determination in step S570 is NO, so that execution of the CPU 31 goes to the instruction in step S600 via that in step S590.

At that time, because the instruction in step S530 is not executed so that no initial values are set to the respective counters 49a, 49b, and 49c, the determination in step S600 is NO, and thereafter, execution of the CPU 31 proceeds to step S620. This permits the default "1" of the at least one bit data stored in the register 41b to be kept, making it possible for the input selecting module 41 to continuously pass the cam-edge signal to the modules 43, 45, 47, and 49.

Next, in step S630, because the cam-position determining flag holds the information indicative of the default of OFF (the determination in step S630 is NO), the cam-edge interrupt task is exited.

Thereafter, when the next active edge appears in the cam-edge signal (see E42 in FIG. 13), the cam-position determining flag F2 holds the information indicative of the default of OFF and the count value of the guard counter 49b is incremented by 1×f from the count value "1×f" so as to become "2×f" (see sections e42 in FIG. 13). This allows the determination in step S520 to be affirmative.

After the affirmative determination in step S520, the initial values, which are determined based on the current active edge (E42) in the cam-edge signal and the table T, are stored in the corresponding counters 49a, 49b, and 49c, respectively in step S530. Specifically, the initial values of 3600 equivalent to "3×f", 4800 equivalent to "4×f", and 3600 equivalent to "3×f" are stored, as their count values, in the reference counter 49a, the guard counter 49b, and the angular counter 49c, respectively (see the table T in FIG. 12).

After the execution of the instruction in step S530, the cam-position determining flag F2 is set to the information indicative of ON in step S540.

Thereafter, because the count value of the guard counter 49b is not set to "0", and the next active edge E43 appearing in the cam-edge signal does not correspond to the change point Q1, the instructions in steps S570, S590, S600, and S620 are sequentially executed by the CPU 31. Then, execution of the CPU 31 goes to step S630.

In step S630, because the current active edge E42 in the cam-edge signal does not correspond to the change point Q1 and the cam-position determining flag F2 is set to the information indicative of ON, the determination in step S630 is YES. Thus, execution of the CPU 31 is shifted to step S640.

In step S640, it is checked whether the count value of the event counter C2 is greater than "0".

Because the count value of the event counter C2 remains the default of "0", the instructions in steps S660, S670, and S680 are executed by the CPU 31 with the instruction in step S650 being skipped. This allows the parameters including the threshold value of the threshold register 47b, the information stored in the enabling/disabling register 47c, and the count value of the event counter C2 to be determined, and thereafter, the cam-edge interrupt task is exited.

Specifically, in the embodiment, as the threshold value, "150" is stored in the threshold register 47b in step S660, and the information indicative of "disabling" and stored in the enabling/disabling register 47c is changed to "enabling" in step S670. In addition, as the event value, "4" is stored in the event counter C2 in step S680.

Before an appearance of the next active edge E43 in the cam-edge signal (see the section e42 in FIG. 13), the information indicative of "enabling" allows the pass-angle measuring module 47 to output an interrupt in synchronization with a rising edge of each multiplication clock pulse appearing in the multiplication clock signal. The interrupt output from the pass-angle measuring module 47 is passed to the CPU 31 so that the CPU 31 executes a pass-angle interrupt task described hereinafter.

Thereafter, the next active edge E43 whose next active edge corresponds to the change point Q1 appears in the cam-edge signal (see FIG. 13).

The appearance of the active edge E43 in the cam-edge signal allows:

the initial values of 4800 equivalent to "4×f", 6000 equivalent to "6×f", and 4800 equivalent to "4×f" to be stored, as their count values, in the reference counter 49a, the guard counter 49b, and the angular counter 49c, respectively (see step S530 and the table T in FIG. 12); and the determination in step S600 to be affirmative.

The affirmative determination in S600 permits the at least one bit data of "1" stored in the register 41b to be changed to "0". This permits the input selecting module 41 from passing the cam-edge signal to the modules 43, 45, 47, and 49 (see step S610). Thereafter, execution of the CPU 31 goes to step S630.

At that time, the current active edge E43 in the cam-edge signal does not correspond to the change point Q1 and the cam-position determining flag F2 is set to the information indicative of ON. For this reason, the determination in step S630 is YES. Thus, execution of the CPU 31 is shifted to step S640.

Because the count value of the event counter C2 is cleared (zero) by the pass-angle interrupt task described hereinafter, the determination in step S640 is NO, so that the following instructions S660 to S680 are executed by the CPU 31, and thereafter, the cam-edge interrupt task is exited.

As described above, no cam-edge signal is passed to the modules 43, 45, 47, and 49 from the input selecting module 41 while the data stored in the register 41b represents "0". For this reason, no active edge Q1 appearing in the cam-edge signal is passed to the modules 43, 45, 47, and 49. This results in that the counters 43a and 47a continuously count up until the next active edge E44 after the active edge Q1 appears in the cam-edge signal (see a section e43 in FIG. 13).

When the next active edge E44 appears in the cam-edge signal, the count value of the guard counter 49b has been increased to reach "7200" since "6000" equal to (5×f) set in step S530 at the appearance of the active edge E43 in the cam-edge signal (see FIG. 13). Because the count value "7200" of the guard counter 49b is equal to the product of the multiplication number f2 (1200) and the number of cylinders, which is 6 in the embodiment, the determination in step S550 is YES. Thus, "0" is set to the count value of the guard counter 49b in step S560.

Thus, the determination in step S570 is YES, so that the reference counter 49a executes the count-up operation in the enabling mode in step S580.

Even if the count value of the guard counter 49b is set to "0" in step 560, because the operating mode of the reference counter 49a is set to the enabling mode in step S580, the reference counter 49a continuously counts up until the count value reaches the upper limit stored in the first register 49d (see a section e44 in FIG. 13).

Before an appearance of the next active edge E45 in the cam-edge signal (see a section e44 in FIG. 13), the information indicative of "enabling" allows the pass-angle measuring module 47 to output an interrupt in synchronization with a rising edge of each multiplication clock pulse appearing in the multiplication clock signal. The interrupt output from the pass-angle measuring module 47 is passed to the CPU 31 so that the CPU 31 executes the pass-angle interrupt task described hereinafter.

Thus, as described above, because the count value of the event counter C2 is cleared (zero) by the pass-angle interrupt task, the determination in step S640 is NO, so that the following instructions S660 to S680 are executed by the CPU 31, and thereafter, the cam-edge interrupt task is exited.

When the next active edge (E45) appears in the crank signal (see FIG. 13), the count value of each of the reference counter 49a and the angular counter 49c reaches the upper limit "7200 (6×f)" stored in the first register 49d with the count value of the guard counter 49b remaining "0". This allows the count values of the reference counter 49a and the angular counter 49c to be cleared (zero) (see the section e44 in FIG. 13).

Thereafter, as described above, the instructions in steps S550, S570, S590, S600, S620, and S630 to S680 are repeatedly executed by the CPU 31 each time an active edge appears in the cam-edge signal until it is determined that an active edge immediately before a change point Q appears in the cam-edge signal (see sections e45 and e46 in FIG. 13). During the repeat executions of the instructions in steps S550, S570, S590, S600, S620, and S630 to S680, when an active edge immediately before a change point Q appears in the cam-edge signal (the determination in step S600 is YES), the instruction in step S610 in place of that in step S620 is executed.

In addition, while the count value of the guard counter 49b is cleared (zero) each time it reaches the product of the multiplication number f2 (1200) and the number (6) of cylinders, the instructions in steps S550, S570, S590, S600, S620, and S630 to S680 are repeatedly executed by the CPU 31 (see sections e47 and e48).

(5) Pass-Angle Interrupt Task

Fifth, instructions of a pass-angle interrupt task program will be described hereinafter with reference to FIG. 14. The instructions allow the CPU 31 to execute the pass-angle interrupt task each time an interrupt generated by the pass-angle measuring module 47 is input to the CPU 31 while the information stored in the enabling/disabling register 47c is set to information indicative of "enabling" in step S670.

Figure 14:
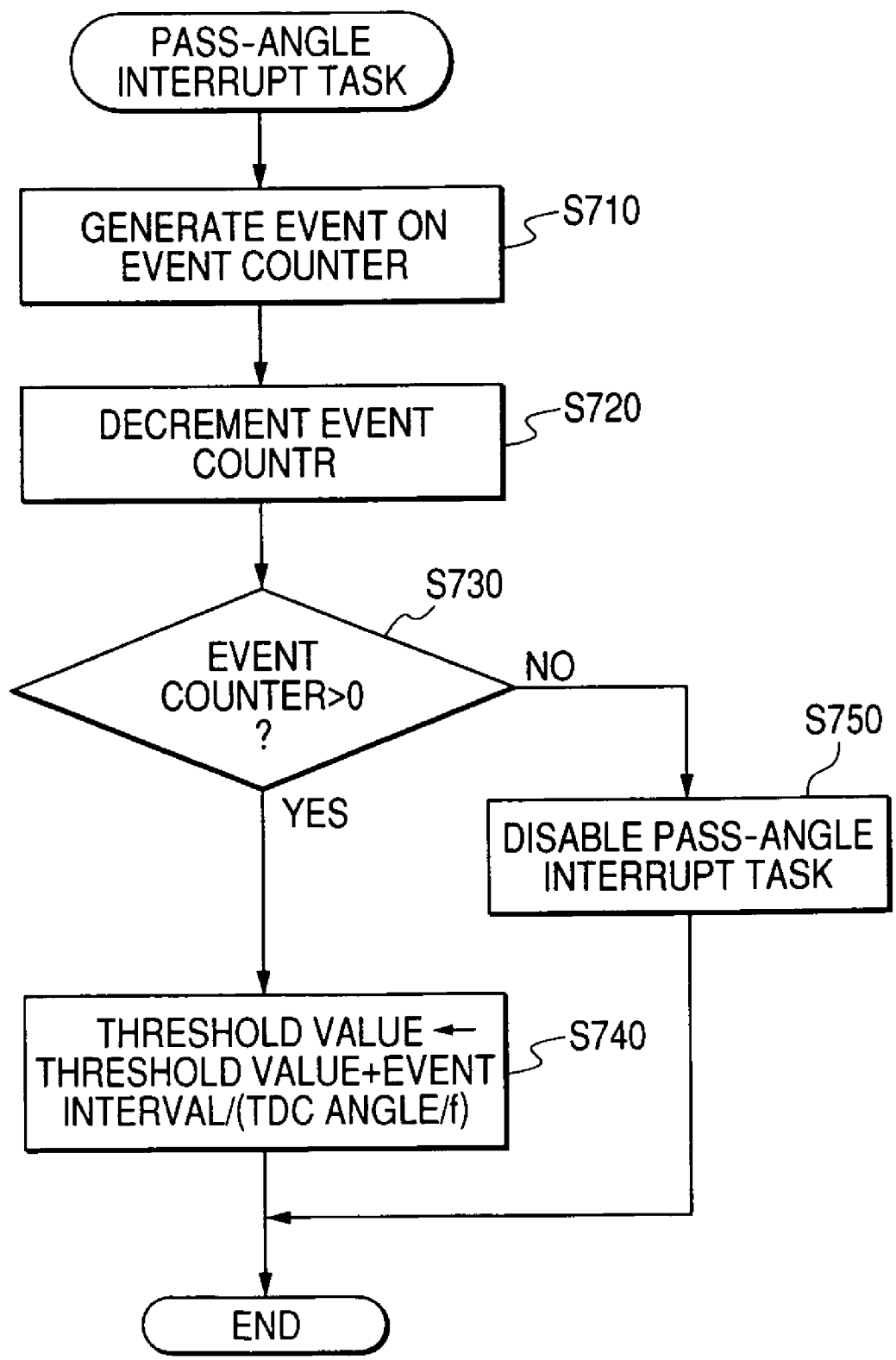
FIG. 14 is a flowchart schematically illustrating a pass-angle interrupt task to be executed by the CPU illustrated in FIG. 1.

When an interrupt input from the pass-angle measuring module 47 to the CPU 31 triggers to launch the pass-angle interrupt task program, the CPU 31 generates the number of events based on the count value of the event counter C2 in step S710 of FIG. 14. Each of these events determines an activation timing for one of the individual control targets associated with engine control, such as an injector and/or an igniter for a corresponding one of the individual cylinders. The event generating instruction in step S710 is similar to that in step S460 of FIG. 7.

Next, the CPU 31 decrements the count value of the event counter C2 by 1, and checks whether the count value of the event counter C2 exceeds "0" in step S730.

If it is determined that the count value exceeds "0" (the determination in step S730 is YES), the CPU 31 updates the threshold value stored in the threshold register 47b to a new one in step S740. In the embodiment, the CPU 31 overwrites the threshold value stored in the threshold register 47b with a new threshold value determined by:

dividing the TDC angle (120° CA) by the multiplication number f2 (1200) to obtain "120/1200";

dividing the event interval (30° CA) by "120/1200" to obtain "30/(120/1200)"; and adding the obtained value "30/(120/1200)" equal to 300 to the threshold value previously stored in the register 47b.

Specifically, the sum of the obtained value "300" and the threshold value stored in the register 47b is stored therein as a threshold value in step S740.

Otherwise if it is determined that the count value is equal to "0" (the determination in step S730 is NO), the CPU 31 rewrites the information stored in the enabling/disabling register 47c from the information indicative of "enabling" to information indicative of "disabling" in step S750. This prevents the pass-angle interrupt program from being launched even if an interrupt is input to the CPU 31.

Thereafter, the CPU 31 exits the pass-angle interrupt task.

As described above, in the cam-edge interrupt task, the threshold value of "150", the information indicative of "enabling", and the event value of "4" are respectively set to the threshold register 47b, the enabling/disabling register 47c, and the event counter C2 (see steps S660, S670, and S680).

Figure 15:
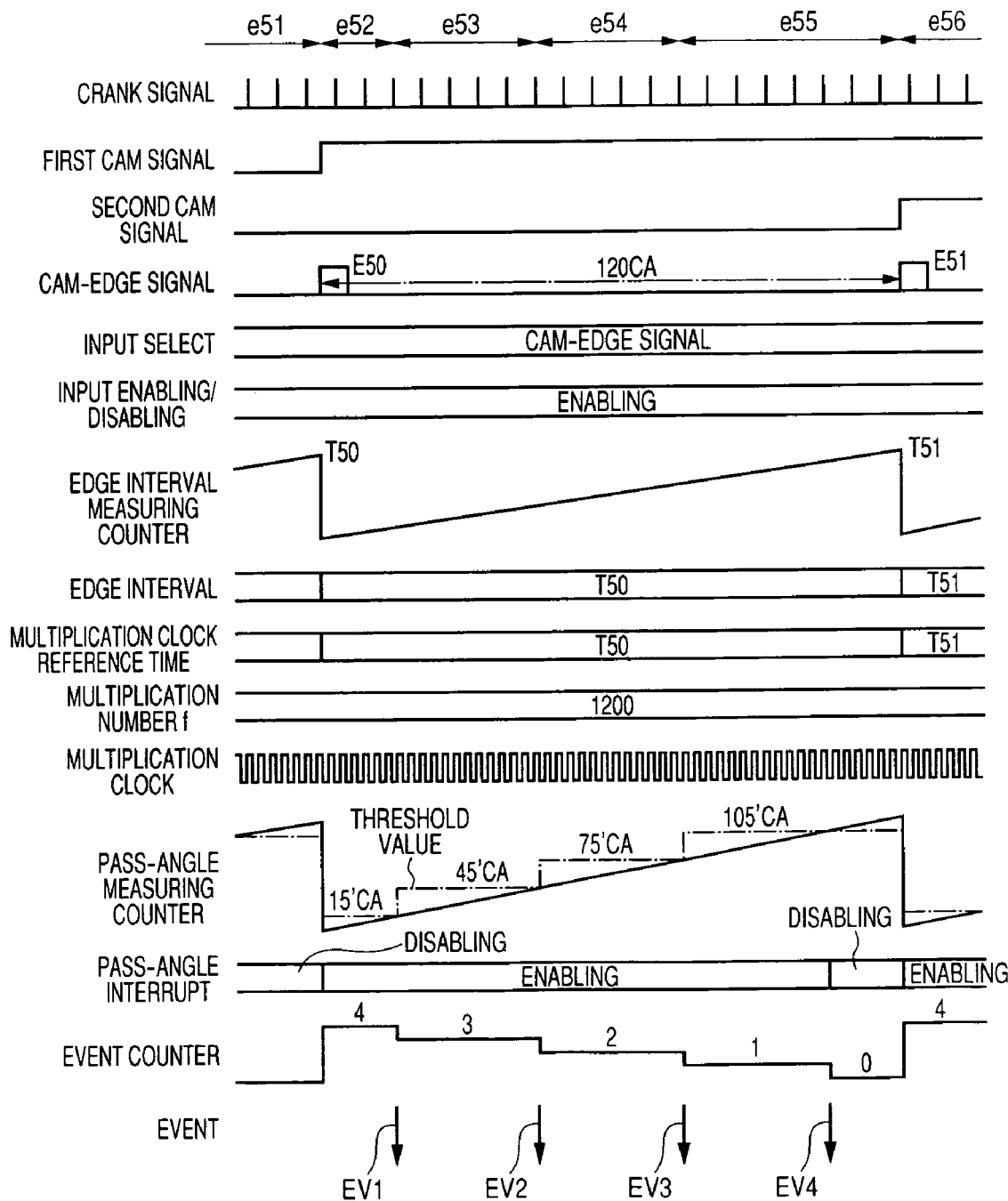
FIG. 15 is a time chart schematically illustrating variations of parameters of the angle clock generating unit with variation of the input signal during the cam-edge interrupt task illustrated in FIG. 11.

In this state, when the pass-angle measuring counter 47b is reset in synchronization with the appearance of an active edge (E50) in the cam-edge signal, the pass-angle measuring module 47 outputs an interrupt in synchronization with a rising edge of each multiplication clock pulse appearing in the multiplication clock signal (see a section e51 in FIG. 15).

Thereafter, the pass-angle interrupt task is executed by the CPU 31 each time an interrupt is input to the CPU 31 until the execution of the instruction in step S750 is completed.

Specific operations of the respective modules 41, 43, 45, 47, and 49 under control of the CPU 31 and variations of the parameters, such as the count values of the counters 47a and C2 and the threshold value stored in the threshold register 47b, will be described hereinafter with reference to FIGS. 14 to 16.

When the count value of the pass-angle measuring counter 47b reaches the threshold value of "150" stored in the threshold register 47c with rotation of each of the first and second camshafts CM1 and CM2 by 15° CA (see a section e52 in FIG. 15), an interrupt is generated by the pass-angle measuring module 47 to be input to the CPU 31, so that the pass-angle interrupt task is activated.

Upon activation of the pass-angle interrupt task, the count value of the event counter C2 is decremented from "4" to "3" in step S720 after events EV1 are generated in step S710 (see "DIVIDING EVENT" in FIG. 15). Because the count value "3" of the event counter C2 at that time is greater than "0", the determination in step S720 is affirmative, so that the threshold value "150" of the threshold register 47c is added to "300" so as to be updated to "450".

When the count value of the pass-angle measuring counter 47b reaches the threshold value of "450" stored in the threshold register 47c with rotation of each of the first and second camshafts CM1 and CM2 by 45° CA (see a section e53 in FIG. 15), an interrupt is generated by the pass-angle measuring module 47 to be input to the CPU 31, so that the pass-angle interrupt task is activated.

Upon activation of the pass-angle interrupt task, the count value of the event counter C2 is decremented from "3" to "2" in step S720 after events EV2 are generated in step S710. Because the count value "2" of the event counter C2 at that time is greater than "0", the determination in step S720 is affirmative, so that the threshold value "450" of the threshold register 47c is added to "300" so as to be updated to "750".

When the count value of the pass-angle measuring counter 47b reaches the threshold value of "750" stored in the threshold register 47c with rotation of each of the first and second camshafts CM1 and CM2 by 75° CA (see a section e54 in FIG. 15), an interrupt is generated by the pass-angle measuring module 47 to be input to the CPU 31, so that the pass-angle interrupt task is activated.

Upon activation of the pass-angle interrupt task, the count value of the event counter C2 is decremented from "2" to "1" in step S720 after events EV3 are generated in step S710. Because the count value "1" of the event counter C2 at that time is greater than "0", the determination in step S720 is affirmative, so that the threshold value "750" of the threshold register 47c is added to "300" so as to be updated to "1050".

When the count value of the pass-angle measuring counter 47b reaches the threshold value of "1050" stored in the threshold register 47c with rotation of each of the first and second camshafts CM1 and CM2 by 105° CA (see a section e55 in FIG. 15), an interrupt is generated by the pass-angle measuring module 47 to be input to the CPU 31, so that the pass-angle interrupt task is activated.

Upon activation of the pass-angle interrupt task, the count value of the event counter C2 is decremented from "1" to "0" in step S720 after events EV4 are generated in step S710.

When the count value of the event counter C2 is dectemented to become "0", the determination in step S730 is NO, so that the information indicative of "disabling" is stored in the enabling/disabling register 47c.

This prevents the pass-angle interrupt task from being activated until the information indicative of "enabling" is stored in the enabling/disabling register 47c in response to an appearance of the next active edge (E51) in the cam-edge signal 120° CA after the active edge E50 (see a section e55 in FIG. 15).

In addition, the pass-angle measuring counter 47b continuously counts up until the count value reaches "1200" corresponding to rotation of each of the first and second camshafts CM1 and CM2 by 120° CA. When the count value of the pass-angle measuring counter 47b reaches "1200", the appearance of the active edge E51 clears the count value of the pass-angle measuring counter 47b (see FIG. 15).

As described above, as illustrated in FIG. 15, at least one event in a limp home mode is generated by the pass-angle measuring interrupt task from a rotational position of the each camshaft 15° CA before a change point P every time each camshaft rotates by the event interval of 30° CA (15° CA, 45° CA, 75° CA, and 105° CA). The events generated by the pass-angle measuring interrupt tasks permit the vehicle to be driven in the limp home mode.

Figure 11:
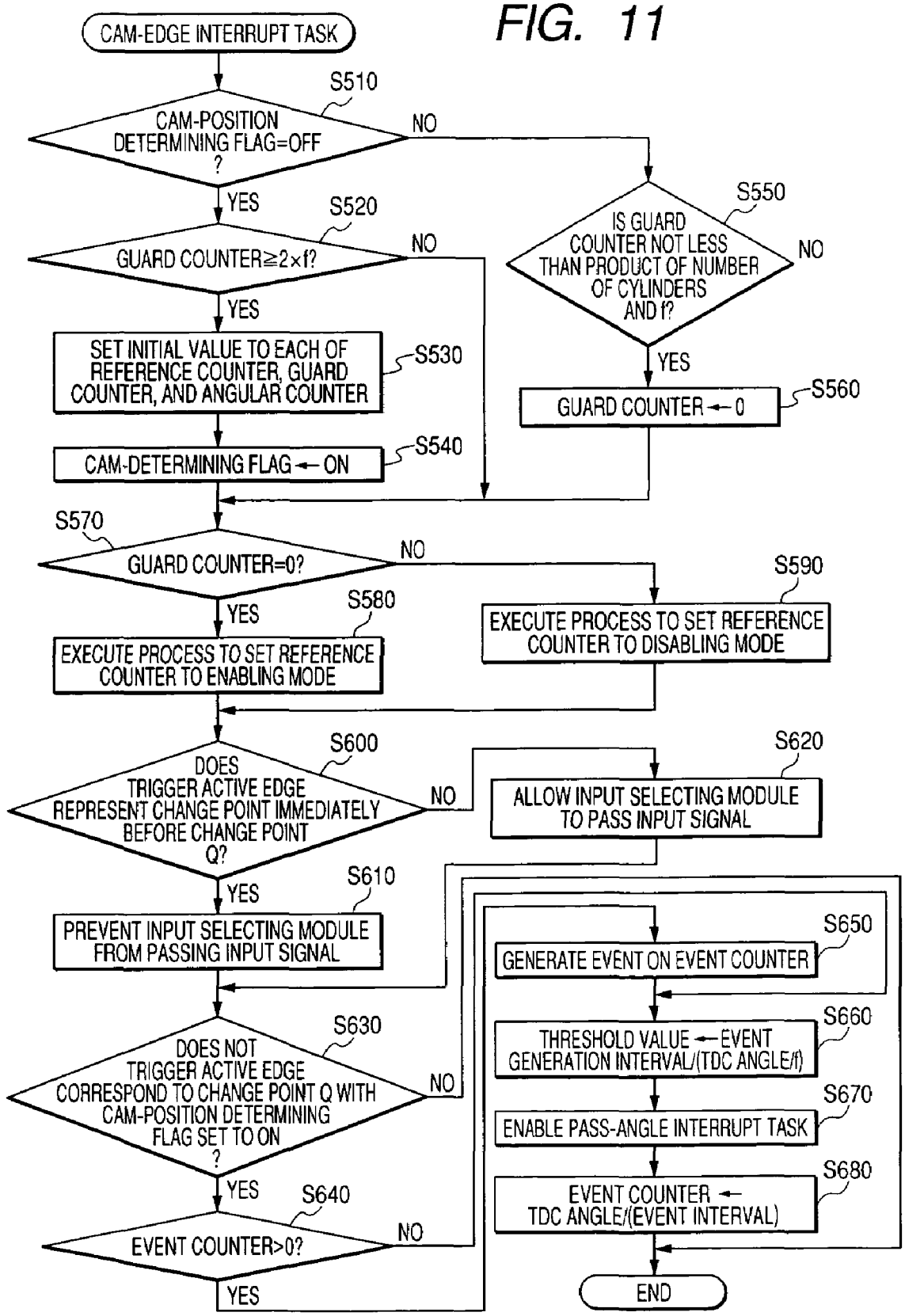
FIG. 11 is a flowchart schematically illustrating a cam-edge interrupt task to be executed by the CPU illustrated in FIG. 1.

It is to be noted that, in the cam-edge interrupt task, when it is determined that the determination in step S640 is YES, the CPU 31 generates the number of events based on the current count value of the event counter C2 in step S650 of FIG. 11.

As described above and illustrated in FIGS. 11, 14 and 15, in the pass-angle interrupt task to be executed by the CPU 31 in synchronization with an active edge in the cam-edge signal, it is assumed that each of the camshafts CM1 and CM2 rotates with temporally adjacent change points P kept constant of 120° CA. In this assumption, therefore, because the count value of the event counter C2 becomes "0" before the next active edge appears in the cam-edge signal, the determination in step S640 is constantly NO.

However, for example, it is assumed that the engine suddenly accelerates at the timing of an appearance of an active edge E52 in the crank signal so that a time interval between the active edge E52 and the next active edge E53 in the cam-edge signal becomes short as compared with normal time intervals of active edges therein.

Figure 16:
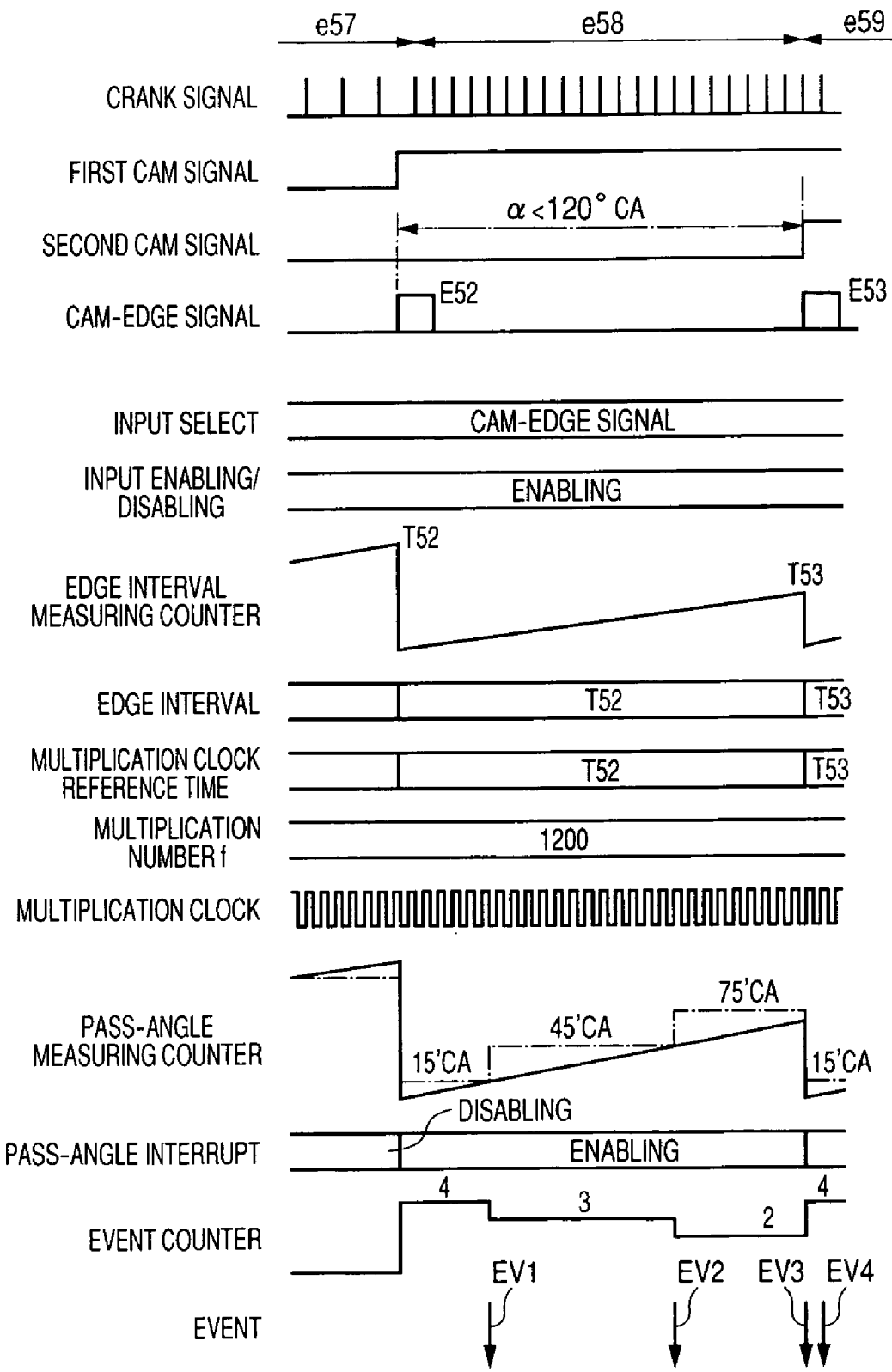
FIG. 16 is a time chart schematically illustrating variations of parameters of the angle clock generating unit with variation of the input signal during the cam-edge interrupt task illustrated in FIG. 11.

In this assumption, as illustrated in FIG. 16, the active edge E53 may appear in the cam-edge signal before the number of repetition of the pass-angle interrupt tasks reaches a predetermined number of '4' in the embodiment, in other words, before the count value of the even counter C2 does not reach "0". This may cause the determination in step S640 of FIG. 11 to be negative, which may reset, in steps S660 to S680, the parameters including the threshold value of the threshold register 47b, the information stored in the enabling/disabling register 47c, and the event value of the event counter C2.

This may cause some of events that the CPU 31 normally should generate during a time interval of the temporally adjacent active edges E52 and E53 not to be generated.

In address the problem, in the embodiment, when it is determined that the count value of the event counter C2 is not equal to "0" in step S640, the number of events are generated by the CPU 31 based on the current count value of the event counter C2 in step S650.

For example, in FIG. 16, when the count value of the event counter C2 is set to "2", the active edge E53 appears in the cam-edge signal due to the sudden acceleration of the vehicle. In this case, upon appearance of the active edge E53 in the cam-edge signal, the number "2" of events corresponding to the count value of the event counter C2 are generated by the CPU 31 (see sections e57 to e59 and EV4 in FIG. 16). This makes it possible to generate all events that the CPU 31 normally should generate during a time interval of temporally adjacent active edges in the cam-edge signal even when the engine suddenly accelerates.

Figure 6:
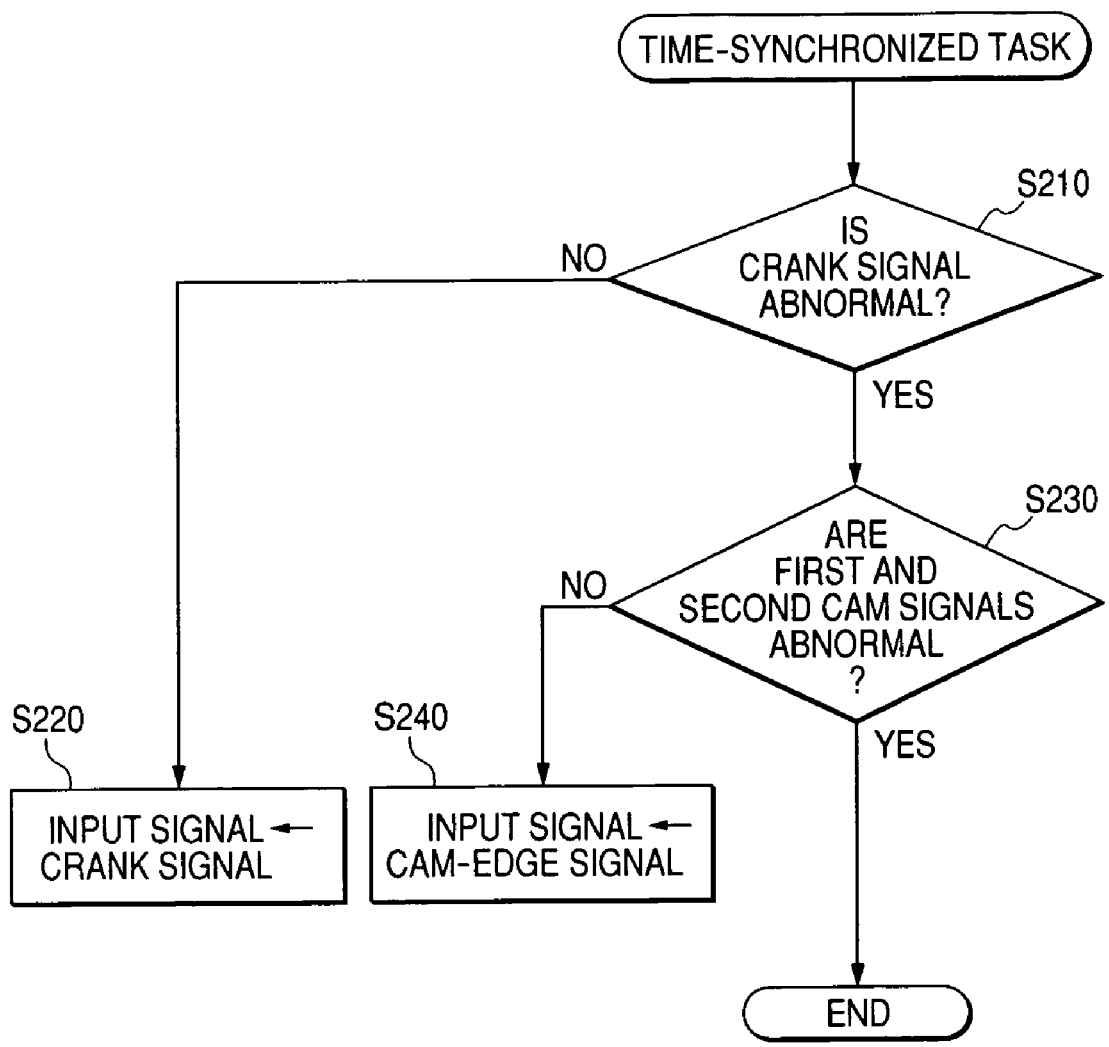
FIG. 6 is a flowchart schematically illustrating a time-synchronized task to be executed by the CPU illustrated in FIG. 1.

As described above, when detecting that the crank signal is abnormal, the ECU 1 is configured to:

change the input signal to be used by the modules in the angle clock generating unit 33 from the crank signal to the cam-edge signal; and change the multiplication number f from the number f1 (60) for the crank signal to the number f2 (1200) for the cam-edge signal (see step S240 in FIG. 6).

This permits a time interval measured by the edge interval measuring counter 43a to be changed from a value corresponding to a rotational angle of the crankshaft CS required to generate temporally adjacent active edges in the crank signal (the unit angle Δθ of 6 degrees crank angle referred to as "first angle" hereinafter) to that corresponding to a rotational angle of each cam shaft required to generate temporally adjacent active edges in the cam-edge signal (120 degrees crank angle referred to as "second angle" hereinafter).

Similarly, a clock cycle of a multiplication clock generated by the multiplication clock generating module 45 is changed from a value obtained by dividing, by the multiplication number f1 (60) for the crank signal, the multiplication-clock time based on the first angle to a value obtained by dividing, by the multiplication number f2 (1200) for the cam-edge signal, the multiplication-clock time corresponding to the second angle.

It is to be noted that the multiplication number f2 for the cam-edge signal is obtained by:

calculating the product of the second angle of 120 degrees crank angle and the multiplication number 60 for the crank signal; and dividing the obtained product by the first angle.

That is, the multiplication number f2 for the cam-edge signal is determined to be "(120×60)/6=1200".

In other words, the relationship between the multiplication number f1 for the crank signal and the multiplication number f2 for the cam-edge signal is given by the following equation:

$$\frac{\alpha 1}{f1} = \frac{\alpha 2}{f2}$$ [Equation 1]

where α1 is the first angle, and α2 is the second angle.

Specifically, the multiplication number f2 for the cam-edge signal is obtained to meet the equation 1.

In other words, in the embodiment, even though the input signal is changed from the crank signal to the cam-edge signal and the multiplication number is changed from the multiplication number f1 (60) for the crank signal to the multiplication number f2 (1200) for the cam-edge signal, the ratio of the multiplication number f1(60) for the crank signal to the first angle is matched with that of the multiplication number f2 (1200) for the cam-edge signal to the second angle.

Specifically, the clock cycle of the multiplication clock generated by the multiplication clock generating module 45 is constant irrespective of changing the multiplication number f from the number f1 for the crank signal to the number f2 for the cam-edge signal and the time interval from a value corresponding to the first angle to that corresponding to the second angle. This is because the ratio of the multiplication number f1(60) for the crank signal to the first angle is matched with that of the multiplication number f2 (1200) for the cam-edge signal to the second angle.

In other words, change of the multiplication number f from the number f1 for the crank signal to the number f2 for the cam-edge signal allows the clock cycle of the multiplication clock to be generated by the multiplication clock generating module 47 to be constant.

Specifically, the clock cycle of the multiplication clock to be used to operate the reference counter 49a and the angular counter 49c of the angle clock module 49 is kept constant before and after change of the input signal and the multiplication number f. This makes it unnecessary for the angle clock module 49 to execute specific tasks for switching its operations before and after change of the input signal and the multiplication number f.

This allows the ECU 1 to just change the input signal and the multiplication number to thereby continue engine control based on the cam-edge signal even when a failure occurs in the crank signal. This makes it unnecessary for the multiplication clock generating module 45, the angle clock module 49, and the timer output unit 35 to execute specific tasks for switching their operations after change of the input signal and the multiplication number f.

Accordingly, the ECU 1 allows, even if an error arises in the crank signal, the vehicle to be driven in a limp-home mode based on the engine control using the cam-edge signal without increasing hardware components and/or software components therein.

In addition, the ECU 1 is designed to change the clock cycle of the multiplication clock from a value obtained by dividing, by the multiplication number f1 (60) for the crank signal, the multiplication-clock time based on the first angle to a value obtained by dividing, by the multiplication number f2 (1200) for the cam-edge signal.

As expressed by the equation, the multiplication number f2 for the cam-edge signal is obtained using the first angle, the multiplication number f1 for the crank signal, and the second angle. For this reason, it is possible to use, as the multiplication number f2 for the cam-edge signal, a value according to the parameters, such as the first angle, the multiplication number f1, and the second angle.

The ECU 1 is designed to prevent the input selecting module 41 from passing the cam-edge signal to the modules 43, 45, 47, and 49 when an active edge appears in the cam-edge signal immediately before a change point Q irregular with respect to the change points P (the determination in step S600 is affirmative). This prevents the counting operation of the edge interval measuring module 43 from being interrupted even if an active edge corresponding to an irregular change point Q appears in the cam-edge signal.

For example, it is assumed that the counting operation of the edge interval measuring module 43 is interrupted at an appearance of an active edge corresponding to a change point Q in the cam-edge signal.

In this assumption, a multiplication clock whose clock cycle during a time interval between a change point P and a change point Q is shorter than a normal clock cycle thereof during temporally adjacent change points P may be generated based on the time interval (count value) of the interrupted module 43 before each of the cam shafts CM1 and CM1 rotates by the second angle.

This may cause the count value of the angular counter 49c to be mismatched with the rotational position of the crankshaft CS, making it difficult to generate events at proper timings; these events determine activation timings for the individual control targets associated with engine control.

Accordingly, in the embodiment, the ECU 1 prevents the counting operation of the edge interval measuring module 43 from being interrupted even if an active edge corresponding to an irregular change point Q appears in the cam-edge signal. This can avoid generation of a multiplication clock whose clock cycle during a time interval between a change point P and a change point Q is shorter than a normal clock cycle thereof during temporally adjacent change points P, making it possible to continuously generate events at individual proper timings.

When an active edge appears in the cam-edge signal at a change point Q, the ECU 1 prevents the input selecting module 41 from passing the cam-edge signal to the modules 43, 45, 47, and 49. This means that the cam-edge signal to be input to the modules 43, 45, 47, and 49 is regarded, from the modules 43, 45, 47, and 49, as a signal that regularly changes in level at the change points P whose angular interval corresponds to the crank angle of 120 degrees crank angle.

This makes it possible for the pass-angle measuring module 47 to continuously execute the measuring operation without causing the modules 43, 45, and 49 to execute specific operations.

In the embodiment, a measured value (count value) of the pass-angle measuring counter 47a depends on a corresponding time interval between temporally adjacent same-directed edges in the crank signal. For this reason, a count value of the pass-angle measuring module 47 corresponding to the time interval of the pulse-missing portion Ma in the crank signal is greater than that of the module 47 corresponding to another time interval of one of the other portions in the crank signal. This allows the CPU 31 to determine whether an active edge appearing in the crank signal represents the end of a pulse-missing portion M in the crank signal (see step S310 in FIG. 7).

Figure 7:
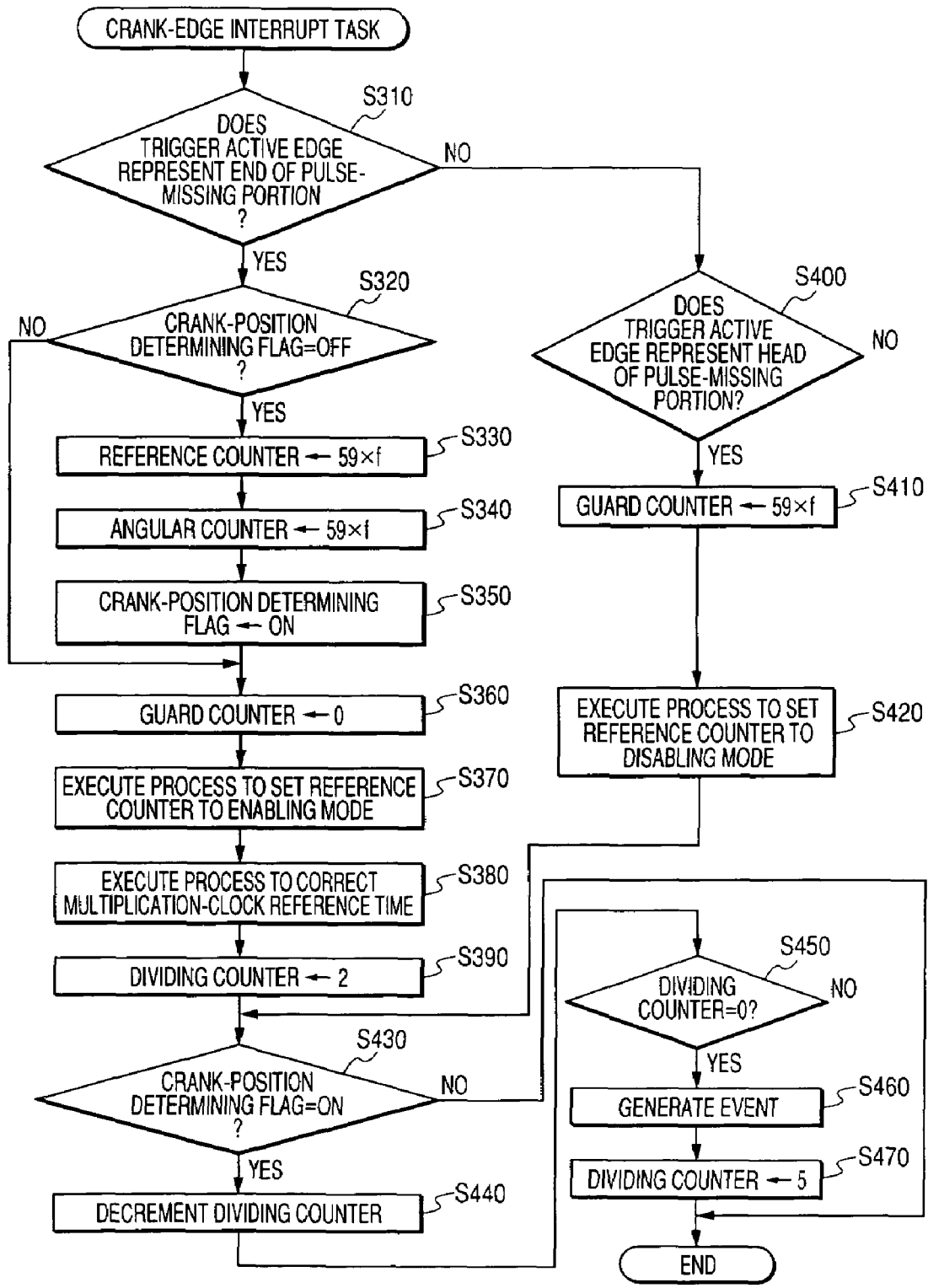
FIG. 7 is a flowchart schematically illustrating a crank-edge interrupt task to be executed by the CPU illustrated in FIG. 1.

When it is determined that an active edge appearing in the crank signal represents the end of a pulse-missing portion M in the crank signal in step S310, a multiplication-clock reference time to be stored in the first register 45a of the multiplication clock generating module 45 is corrected (see step S380 in FIG. 7).

As set forth above, the pass-angle measuring module 47 is installed in the ECU 1 to detect a pulse-missing portion M in the crank signal to thereby smoothly generate the multiplication clock, and, in addition, the cam-edge signal has no pulse-missing portions.

For these reasons, the count value of the pass-angle measuring module (counter) 47 may be normally unused for engine control after the input signal is changed from the crank signal to the cam-edge signal.

In contrast, the ECU 1 according to the embodiment can effectively use the operations of the pass-angle measuring module 47 while the vehicle is driven in the limp-home mode according to the cam-edge signal.

Specifically, the threshold value for the cam-edge interrupt task, such as "150", is stored in the threshold register 47b of the pass-angle measuring module 47 (see step S660 in FIG. 11), and the pass-angle interruption task is activated each time an interrupt generated by the pass-angle measuring module 47 is input to the CPU 31 (see FIG. 14). The activation of the pass-angle interruption task allows generation of events that determine activation timings for the individual control targets associated with engine control.

In the embodiment, when the vehicle is driven in the limp-home mode according to the cam-edge signal, at least one event is generated every time an active edge appears in the cam-edge signal, in other words, every time each camshaft rotates by an angle of predetermined degrees (CA). From this viewpoint, if the engine speed suddenly increases, it would be necessary to bring forward a timing of generation of an active edge in the cam-edge signal immediately after the sudden increase of the engine speed.

In the embodiment, an angular interval between temporally adjacent active edges in the cam-edge signal, such as 120 degrees crank angle, is greater than that between temporally adjacent active edges in the crank signal, such as 6 degrees crank angle. For this reason, there is a high possibility that a timing of generation of an active edge is bright forward in the cam-edge signal.

Specifically, when the engine speed suddenly increases, a next active edge may appear in the cam-edge signal before a next timing at which at least one event should be generated. This may prevent generation of at least one event supposed to be generated.

In this case, in the embodiment, when the count value of the event counter C2 is greater than "0" so that generation of at least one event supposed to be generated is not completed, it is possible to output the at least one event in synchronization with the appearance of the next active edge in the cam-edge signal in step S650 of FIG. 11.

As described above, when generation of at least one event supposed to be generated is not completed until a next active edge appears in the cam-edge signal, it is possible to generate the remaining at least one event in response to the appearance of the next active edge in the cam-edge signal.

In the embodiment, the multiplication clock generating module 45 works to generate a multiplication clock whose clock cycle corresponds a time interval obtained by dividing, by the multiplication number f, a count value (multiplication reference time) measured by the edge interval measuring module 43. The present invention is however limited to the structure.

Specifically, the angle clock generating unit 33 can include a computing module operatively connected to the edge interval measuring module 43 and to the multiplication clock generating module 45. The computing module works to divide, by the multiplication number f, a count value (multiplication reference time) measured by the edge interval measuring module 43, thereby obtaining a value. In addition, the computing module works to pass the obtained value to the multiplication clock generating module 45.

The multiplication clock generating module 45 can work to generate a multiplication clock consisting of a repetitive series of multiplication clock pulses whose clock cycle is equivalent to the obtained value passed from the computing module.

In the embodiment, an angular interval between arbitrary two temporally adjacent points P in the cam-edge signal is set to 120 degrees crank angle, but the present invention is not limited to the setting.

Specifically, an angular interval between arbitrary two temporally adjacent points P in the cam-edge signal can be set to one of regular intervals, such as 30° CA, at which events are normally output during one engine cycle. This allows events to be generated at the regular intervals even through the vehicle is driven in the limp home mode according to the cam-edge signal.

In the embodiment, when a failure occurs in the crank signal, the cam-edge signal is used to generate the multiplication clock in place of the crank signal, but the present invention is not limited to the structure.

Specifically, in place of the crank signal, either the first cam signal or the second cam signal can be used to generate the multiplication clock.

In the case of using the first cam signal in place of the crank signal, the edge interval measuring module 43 for example can measure a time interval between temporally adjacent active edges with regular angular intervals (at regular change points) in the first cam signal except for irregular change points with respect to the regular angular intervals.

Similarly, in the case of using the second cam signal in place of the crank signal, the edge interval measuring module 43 for example can measure a time interval between temporally adjacent active edges in the second cam signal with regular angular intervals (at regular change points) except for irregular change points with respect to the regular angular intervals.

It is surely that, if a cam signal having a level that repetitively changes in time each time a camshaft rotates by a constant angle, the edge interval measuring module 43 can directly use the cam signal to measure a time interval between temporally adjacent active edges in the cam signal.

In the embodiment, the counters are designed to count up, but can be designed to count down.

The counters and the registers of the angle clock generating unit 33 can be implemented as hardwired logical circuits installed in the microcomputer 30.

At least part of each of the input circuit 10 and the output circuit 20 can be implemented as hardware logical circuits, software modules, or a hardware/software integrated system installed in the microcomputer 30.

The tasks (1) to (5) to be executed by the CPU 31 can be implemented as hardware logical circuits or a hardware/software integrated system.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. An apparatus for controlling an engine having a crankshaft and a camshaft, the apparatus comprising:
   an interval measuring unit configured to receive an input signal input thereto, the input signal having a level that repetitively changes in time in a predetermined direction, the interval measuring unit being configured to measure a time interval from when a predetermined-directed level change appears in the input signal to when a temporally next predetermined-directed level change appears therein;
   an input unit configured to input a crank signal as the input signal to the interval measuring unit, the crank signal having a level that repetitively changes in a predetermined direction each time the crankshaft rotates by a first angle;
   a multiplication clock generating unit configured to generate a first multiplication clock including a train of clock pulses whose clock cycle is determined by dividing, by a first multiplication number, the interval measured by the interval measuring unit;
   a count unit configured to count in synchronization with the first multiplication clock generated by the multiplication clock generating unit,
   a count value of the count unit corresponding to a rotational position of the crankshaft in one cycle of the engine when the rotational position thereof is represented with a predetermined resolution, the predetermined resolution being obtained by dividing the first angle by the first multiplication number;
   an event generating unit configured to generate at least one event associated with control of the engine according to a crankshaft's rotational position identified by a count value of the count unit; and
   an abnormality determining unit configured to determine whether the crank signal is abnormal based on a state of the input signal,
   the input unit working to switch the input signal for the interval measuring unit from the crank signal to a cam signal when it is determined that the crank signal is abnormal, the cam signal having a level that repetitively changes in time each time the camshaft rotates at least by a second angle different from the first angle,
   the multiplication clock generating unit working to generate a second multiplication clock to be used in place of the first multiplication clock after it is determined that the crank signal is abnormal, the second multiplication clock including a train of clock pulses whose clock cycle being set to be substantially equivalent to the clock cycle of the first multiplication clock.

2. An apparatus according to claim 1, wherein the multiplication clock generating unit works to determine the clock cycle of the second multiplication clock by dividing, by a second multiplication number, the interval measured by the interval measuring unit, the second multiplication number being determined by dividing, by the first angle, the product of the second angle and the first multiplication number.

3. An apparatus according to claim 1, wherein the camshaft is composed of first and second camshafts, further comprising:
- a cam signal generating unit configured to generate, as the cam signal, a cam transient signal based on a first cam signal and a second cam signal, the first cam signal having a level that repetitively changes in time with rotation of the first camshaft, the second cam signal having a level that repetitively changes in time with rotation of the second camshaft, the cam transient signal changing in time in a predetermined direction at a plurality of points respectively corresponding to individual level-change points of the first and second cam signals, the plurality of points including first points at regular intervals, each of the regular intervals corresponding to the second angle, the plurality of points including second points, each of the second points appearing immediately after one of the first points, an interval between each of the second points and one of the first points corresponding to an angle smaller than the second angle,
- the input unit working to input the cam transient signal generated by the cam signal generating unit as the input signal to the interval measuring unit when it is determined that the crank signal is abnormal;
- a determining unit configured to, while the cam transient signal is input to the interval measuring unit as the input signal, determine whether, each time a predetermined-directed level change appears at one of the plurality of points in the cam transient signal, the one of the plurality of points corresponds to one of the first points immediately before one of the second points based on a state of each of the first cam signal and the second cam signal;
- a measurement continuing unit operatively connected to the interval measuring unit and configured to, when it is determined that the one of the plurality of points corresponds to one of the first points immediately before one of the second points, enable the interval measuring unit to continue the measurement of the time interval until it is determined that another one of the plurality of points does not correspond to one of the first points immediately before one of the second points even though a predetermined-directed level change appears at one of the second points in the cam transient signal.

4. An apparatus according to claim 3, wherein the measurement continuing unit is operatively connected to the input unit and configured to prevent the input unit from inputting the cam transient signal to the interval measuring unit as the input unit until it is determined that another one of the plurality of points does not correspond to one of the first points immediately before one of the second points to thereby enable the interval measuring unit to continue the measurement of the time interval.

5. An apparatus according to claim 3, the determining unit is configured to store therein data indicative of the state of each of the first and second cam signals, the data including correspondences between each of the level-change points of the first cam signal and one of the level-change points of the second cam signal in level and level-change direction.

6. An apparatus according to claim 1, wherein the crank signal is configured such that the predetermined-directed level change repetitively appears each time the crankshaft rotates by the first angle while a rotational position of the crankshaft is within a first region in the one cycle of the engine, and the predetermined-directed level change appears when the crankshaft rotates by a third angle when a rotational position of the crankshaft is within a second region in the one cycle of the engine, the third angle is a predetermined number times greater than the first angle, further comprising:
- an edge count unit configured to count same-directed edges of the clock pulses in one of the first and second multiplication clocks generated by the multiplication clock generating unit, the same-directed edges appearing in the corresponding one of the first and second multiplication clocks during a time interval between temporally adjacent predetermined-directed level changes in the input signal; and
- a correcting unit configured to, when a count value of the edge count unit reaches a predetermined value that corresponds to a point of time at which the rotational position of the crankshaft reaches the second region while the crank signal is input to the interval measuring unit, correct the count value of the edge count unit using the predetermined number,
- wherein, after it is determined that the crank signal is abnormal, the event generating unit is configured to grasp a rotational angle of the camshaft based on the count value of the edge count unit, and to generate the at least one event at least one time according to the rotational angle of the camshaft.

7. An apparatus according to claim 6, further comprising an event generation assist unit configured to:
- after it is determined that the crank signal is abnormal, determine, after a predetermined-directed level change appears in the input signal, whether a temporally next predetermined-directed level change appears before the event generating unit generates the at least one event supposed to be generated; and
- generate the at least one event in synchronization with the appearance of the temporally next predetermined-directed level change.

* * * * *